(12) United States Patent
Kato et al.

(10) Patent No.: US 8,184,807 B2
(45) Date of Patent: May 22, 2012

(54) CONTENT DISTRIBUTION/BROWSING SYSTEM, CONTENT DISTRIBUTION APPARATUS, CONTENT BROWSING APPARATUS AND PROGRAM

(75) Inventors: Takehisa Kato, Fuchu (JP); Koji Okada, Tokyo (JP); Norikazu Hosaka, Fuchu (JP); Yoshihiro Fujii, Fuchu (JP); Minako Tada, Komae (JP)

(73) Assignees: Kabushiki Kaisha Toshiba, Tokyo (JP); Toshiba Solutions Corporation, Tokyo (JP)

( * ) Notice: Subject to any disclaimer, the term of this patent is extended or adjusted under 35 U.S.C. 154(b) by 1021 days.

(21) Appl. No.: 12/133,569

(22) Filed: Jun. 5, 2008

(65) Prior Publication Data
US 2008/0304661 A1  Dec. 11, 2008

(30) Foreign Application Priority Data
Jun. 6, 2007 (JP) ................................. 2007-150915

(51) Int. Cl.
*H04L 9/00* (2006.01)

(52) U.S. Cl. ............. 380/44; 380/277; 380/281; 380/37

(58) Field of Classification Search .............. 380/28–30, 380/44–47, 277–286
See application file for complete search history.

(56) References Cited

U.S. PATENT DOCUMENTS

| 5,555,309 A * | 9/1996 | Kruys ........................... 380/280 |
| 2004/0086126 A1* | 5/2004 | Lain et al. ..................... 380/277 |
| 2009/0074181 A1* | 3/2009 | Pelletier ......................... 380/29 |

FOREIGN PATENT DOCUMENTS

| EP | 576224 A2 * | 12/1993 |
| JP | 2004-32307 A | 1/2004 |

OTHER PUBLICATIONS

Adi Shamir, "How to Share a Secret", Communication of the ACM, vol. 22, No. 11, Nov. 1979, pp. 612-613.

* cited by examiner

*Primary Examiner* — Vivek Srivastava
*Assistant Examiner* — Jayesh Jhaveri
(74) *Attorney, Agent, or Firm* — Oblon, Spivak, McClelland, Maier & Neustadt, L.L.P.

(57) ABSTRACT

A content distribution/browsing system is disclosed. First to (m−1)th encrypted content items $E(K_1, C_1\|K_{2,1})$, ..., $E(K_{m-1}, C_{m-1}\|K_{m,1})$ contain second to m-th (next in order) sharing keys $K_{2,1}, \ldots, K_{m,1}$, respectively. When desirous of browsing an (i+1)th content item $C_{i+1}$, the (i+1)th sharing key $K_{i+1,1}$ is acquired by browsing an immediately preceding i-th content item $C_i$.

13 Claims, 20 Drawing Sheets

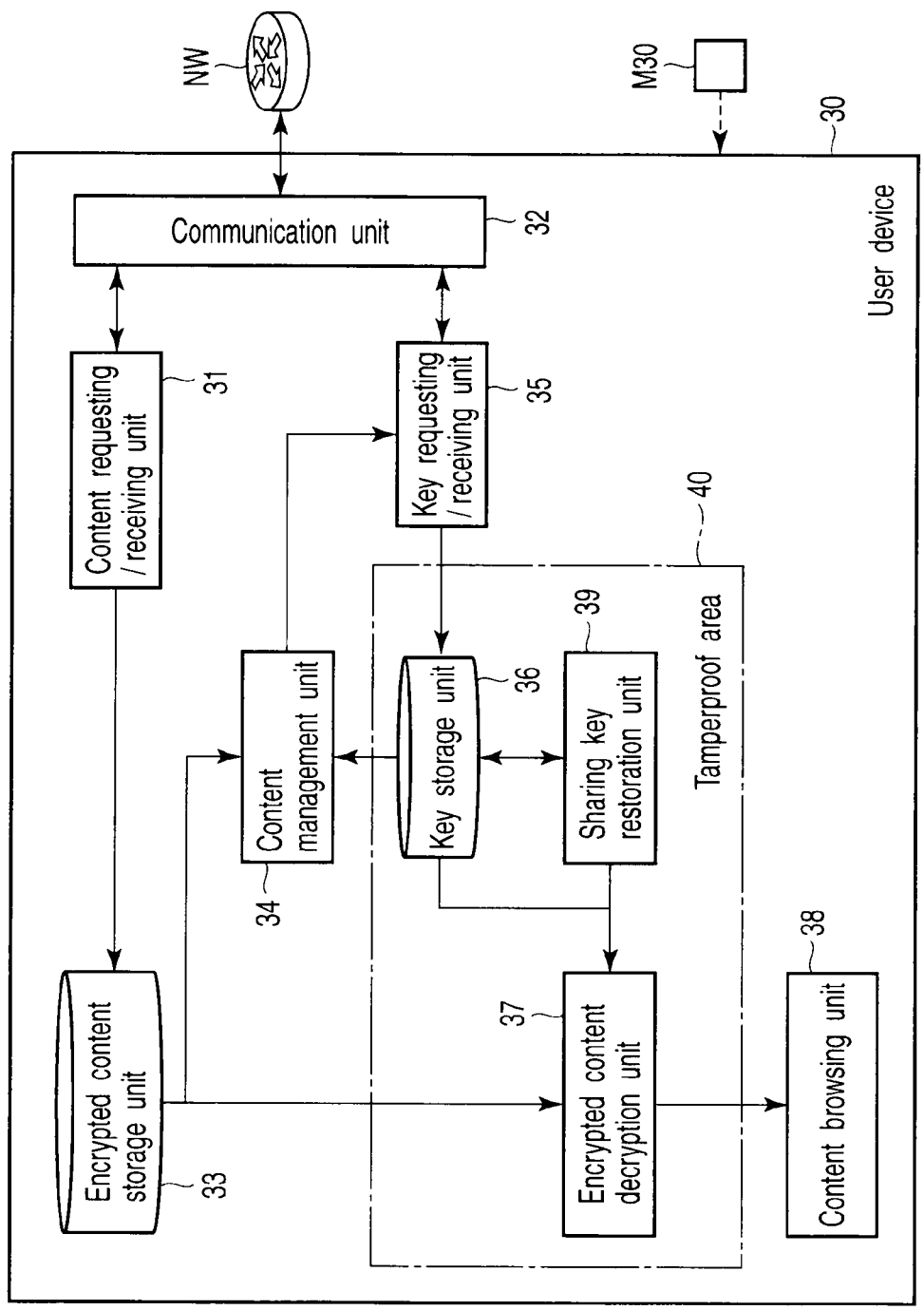
F I G. 3

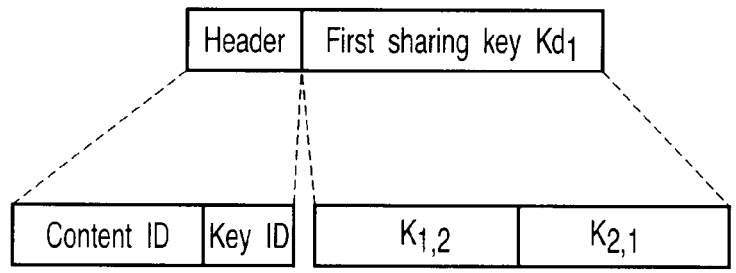
FIG. 11
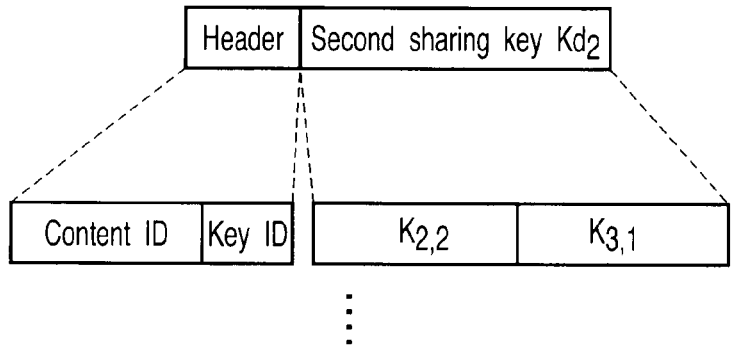
FIG. 12A
FIG. 12B
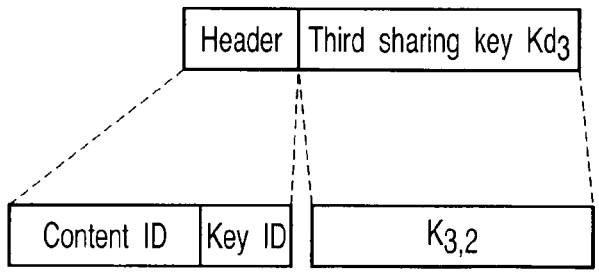
FIG. 12C

|  | Encryption key | | | | | |
|---|---|---|---|---|---|---|
|  | $K_1$ | $K_2$ | $K_3$ | ... | $K_{m-1}$ | $K_m$ |
| Initial sharing key $Kd_0$ | $K_{1,1}$ |  |  | ... |  |  |
| First sharing key $Kd_1$ | $K_{1,2}$ | $K_{2,1}$ |  |  |  |  |
| Second sharing key $Kd_2$ |  | $K_{2,2}$ | $K_{3,1}$ |  |  |  |
| Third sharing key $Kd_3$ |  |  | $K_{3,2}$ | ... |  |  |
| ... |  |  |  | ... |  |  |
| (m-1)th sharing key $Kd_{m-1}$ |  |  |  |  | $K_{m-1,2}$ | $K_{m,1}$ |
| m-th sharing key $Kd_m$ |  |  |  |  |  | $K_{m,2}$ |

FIG. 15

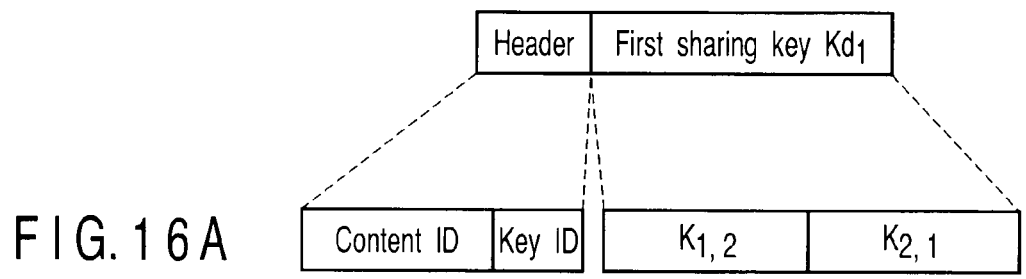
F I G. 1 6 A
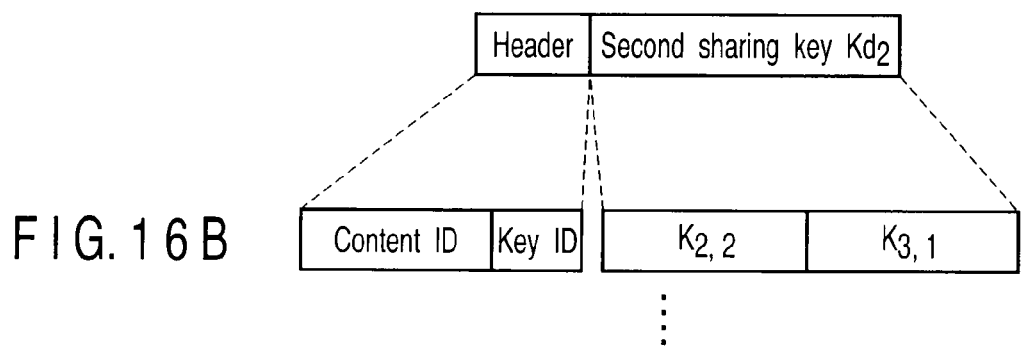
F I G. 1 6 B
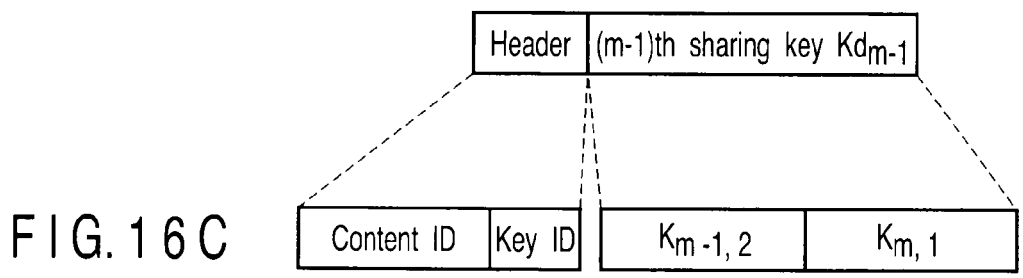
F I G. 1 6 C
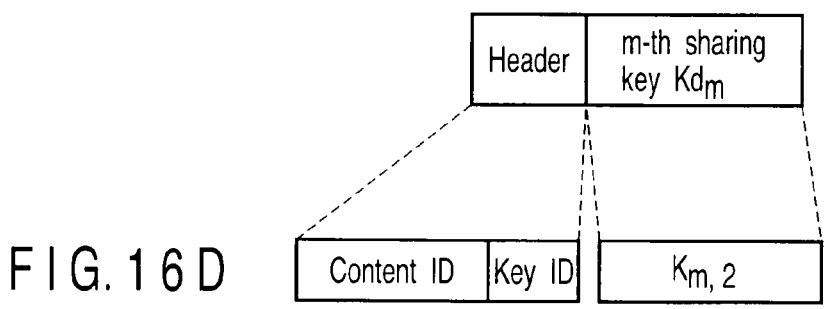
F I G. 1 6 D

|  | Encryption key | | | | | |
|---|---|---|---|---|---|---|
|  | $K_1$ | $K_2$ | $K_3$ | ... | $K_{m-1}$ | $K_m$ |
| Initial sharing key $Kd_0$ | $K_{1,1}$ | $K_{2,1}$ | $K_{3,1}$ | ... | $K_{m-1,1}$ | $K_{m,1}$ |
| First sharing key $Kd_1$ | $K_{1,2}$ |  |  |  |  |  |
| Second sharing key $Kd_2$ |  | $K_{2,2}$ |  |  |  |  |
| Third sharing key $Kd_3$ |  |  | $K_{3,2}$ |  |  |  |
| ... |  |  |  | ... |  |  |
| (m-1)th sharing key $Kd_{m-1}$ |  |  |  |  | $K_{m-1,2}$ |  |
| m-th sharing key $Kd_m$ |  |  |  |  |  | $K_{m,2}$ |

FIG. 18

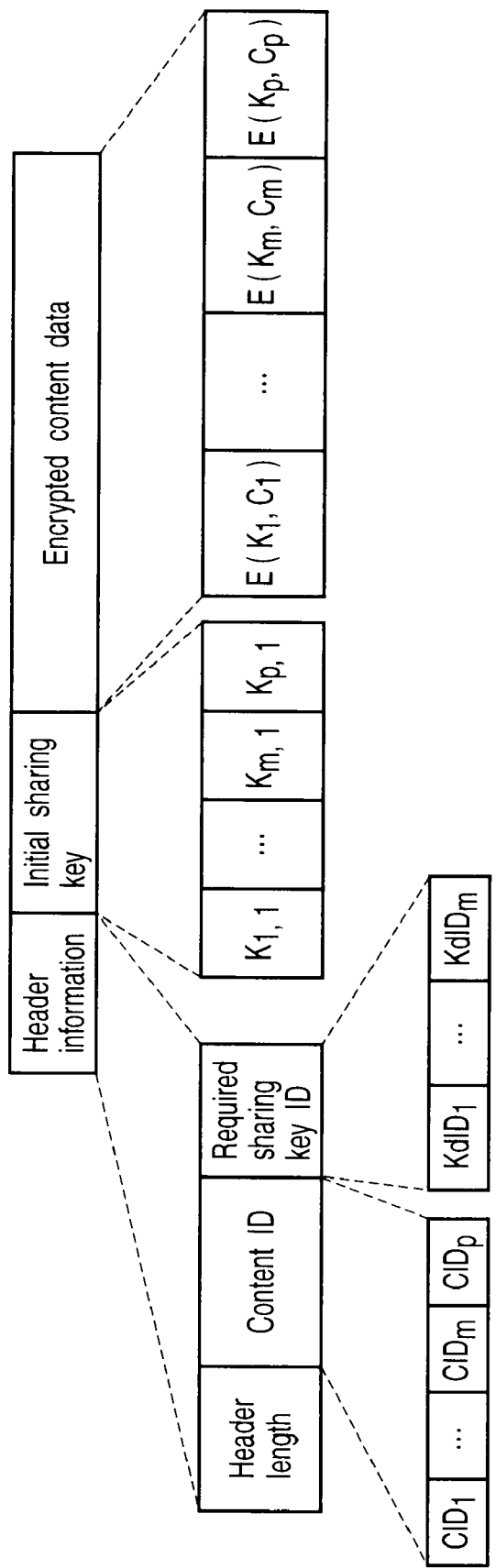
F I G. 20

| | K₁ | K₂ | K₃ | ... | K_{m-1} | K_m | K_p |
|---|---|---|---|---|---|---|---|
| | | | | Encryption key | | | |
| Initial sharing key Kd₀ | K₁,₁ | K₂,₁ | K₃,₁ | ... | K_{m-1,1} | K_{m,1} | K_{p,1} |
| First sharing key Kd₁ | K₁,₂ | | | | | | K_{p,2} |
| Second sharing key Kd₂ | | K₂,₂ | | | | | K_{p,3} |
| Third sharing key Kd₃ | | | K₃,₂ | ... | | | K_{p,4} |
| ... | | | | | | | ... |
| (m-1)th sharing key Kd_{m-1} | | | | | K_{m-1,2} | | K_{p,n-1} |
| m-th sharing key Kd_m | | | | | | K_{m,2} | K_{p,n} |

F I G. 21

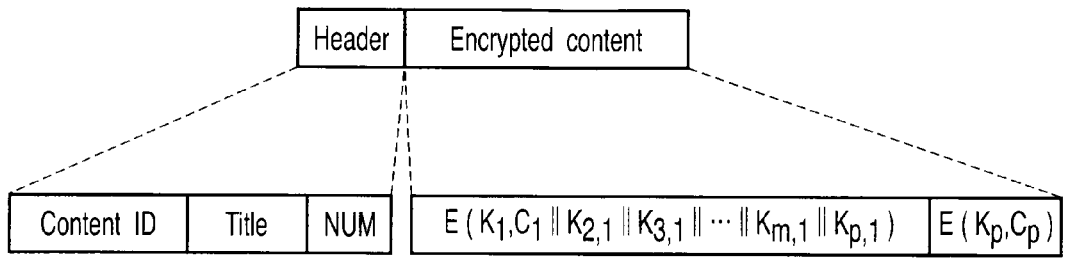
FIG. 24A
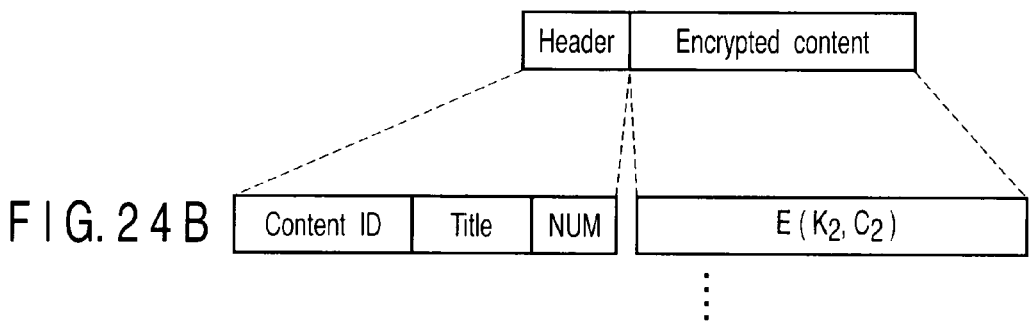
FIG. 24B
FIG. 24C
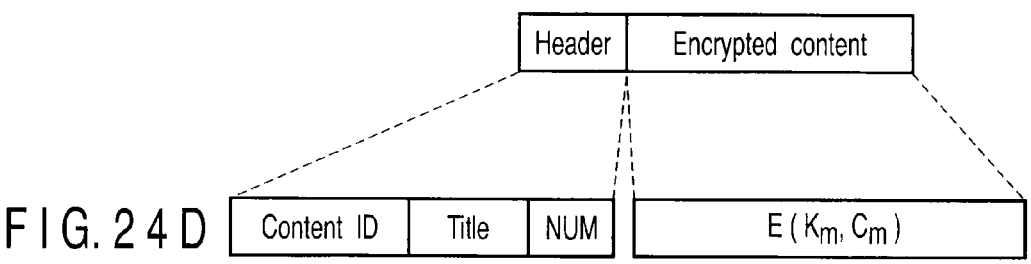
FIG. 24D

CONTENT DISTRIBUTION/BROWSING SYSTEM, CONTENT DISTRIBUTION APPARATUS, CONTENT BROWSING APPARATUS AND PROGRAM

CROSS-REFERENCE TO RELATED APPLICATIONS

This application is based upon and claims the benefit of priority from prior Japanese Patent Application No. 2007-150915, filed Jun. 6, 2007, the entire contents of which are incorporated herein by reference.

BACKGROUND OF THE INVENTION

1. Field of the Invention

The present invention relates to a content distribution/browsing system, a content distribution apparatus, a content browsing apparatus and a program enabling the contents to be browsed in the order intended by, for example, a content producer or a content browser.

2. Description of the Related Art

In the conventional field of content distribution, a superdistribution system is known as a method of prohibiting the browsing of a content item by other than the users who have purchased the content.

Various methods for the superdistribution system have been proposed. Basically, in each method for the superdistribution system, an encrypted content is distributed freely on the one hand and only the users who have purchased the encryption key of the encrypted content can browse the encrypted content on the other hand.

The persons who can browse the content are limited, for example, by encrypting the encryption key of the content with a public key or by encrypting the content with a symmetric key shared by the users. A method is also available in which the symmetric key is shared by a secret sharing scheme (for example, see Jpn. Pat. Appln. KOKAI Publication No. 2004-32307). The secret sharing scheme is described, for example, in A. Shamir: "How to share a secret", Communications of the ACM, 22, 11, pp. 612-613 (1979).

The content distribution methods described above normally pose no problem. The study by the present inventor, however, shows that it is difficult to browse the content in the order intended by the content producer or content distributor. According to the intended order, the encryption keys for the content items of, for example, a plurality of stories including the first, middle and the last parts of a serial drama are distributed one by one from the first story.

Also, in browsing a plurality of content items, it is difficult to browse only a specified content item. In the case where an encryption key for a given number of content items are acquired, for example, it is difficult to permit a specified content item such as "a making video" to be browsed as a privilege.

BRIEF SUMMARY OF THE INVENTION

An object of the present invention is to provide a content distribution/browsing system, apparatus and program capable of realizing the browsing of content items in the order intended by the content producer or the content browser.

According to a first aspect of the present invention, there is provided a content distribution apparatus communicable with a content browsing apparatus, comprising: a key generating device configured to generate a first encryption key $K_1$ and second to m-th sharing keys $K_{2,1}, K_{2,2}, \ldots, K_{m,1}, K_{m,2}$ in sets of two by generating a random number for first to m-th content items $C_1, \ldots, C_m$; an encryption key storage device which stores the first encryption key $K_1$; an encryption key calculation device configured to calculate second to m-th encryption keys $K_2, \ldots, K_m$ based on the sharing keys in the same set of the sharing keys $K_{2,1}, K_{2,2}, \ldots, K_{m,1}, K_{m,2}$; a concatenation device configured to concatenate the first to (m−1)th content items $C_1, \ldots, C_{m-1}$ with the sharing keys $K_{2,1}, \ldots, K_{m,1}$ each constituting one component of each set of the second to m-th sharing keys thereby to produce first to (m−1)th concatenated data $C_1 \| K_{2,1}, \ldots, C_{m-1} \| K_{m,1}$; a sharing key storage device which stores the sharing keys $K_{2,2}, \ldots, K_{m,2}$ each constituting the other component of each set of the second to m-th sharing keys; an encryption device configured to encrypt the first to (m−1)th concatenated data $C_1 \| K_{2,1}, \ldots, C_{m-1} \| K_{m,1}$ based on the first to (m−1)th encryption keys $K_1, \ldots, K_{m-1}$, respectively, thereby to produce the first to (m−1)th encrypted content items $E(K_1, C_1 \| K_{2,1}), \ldots, E(K_{m-1}, C_{m-1} \| K_{m,1})$, while at the same time encrypting the m-th content item $C_m$ based on the m-th encryption key $K_m$ thereby to produce the m-th encrypted content item $E(K_m, C_m)$; an output device configured to output said each encrypted content item $E(K_1, C_1 \| K_{2,1}), \ldots, E(K_{m-1}, C_{m-1} \| K_{m,1}), E(K_m, C_m)$; an encryption key distribution device configured to distribute the encryption key in the encryption key storage device to the content browsing apparatus based on an encryption key request received from the content browsing apparatus; and a sharing key distribution device configured to distribute the sharing keys in the corresponding order in the sharing key storage device to the content browsing apparatus based on any of the second to m-th sharing key requests received from the content browsing apparatus.

Further, according to a second aspect of the present invention, there is provided content distribution apparatus communicable with a content browsing apparatus, comprising: an encryption key generating device configured to generate first to m-th encryption keys $K_1, \ldots, K_m$ and an encryption key $K_p$ other than the encryption keys $K_1, \ldots, K_m$ for first to m-th content items $C_1, \ldots, C_m$ and a content item $C_p$ other than the first to m-th content items $C_1, \ldots, C_m$, respectively; a first sharing key generating device configured to generate first to m-th sharing keys $K_{1,1}, K_{1,2}, \ldots, K_{1,n}, \ldots, K_{m,1}, K_{m,2}, \ldots, K_{m,n}$ in sets of n sharing keys by a (2, n)-threshold secret sharing scheme for the first to m-th encryption keys $K_1, K_m$; a second sharing key generating device configured to generate n sharing keys $K_{p,1}, K_{p,2}, \ldots, K_{p,k}, K_{p,n}$ by the (k, n)-threshold secret sharing scheme for the another encryption key $K_p$; an encryption device configured to encrypt the first to m-th content items $C_1, \ldots, C_m$ and the another content item $C_p$ based on the encryption keys $K_1, \ldots, K_m$ and the another encryption key $K_p$, respectively, thereby to produce first to m-th encrypted content items $E(K_1, C_1), \ldots, E(K_m, C_m)$ and another encrypted content item $E(K_p, C_p)$; a concatenation device configured to concatenate each of the sharing keys $K_{1,1}, \ldots, K_{m,1}$ constituting one component of the first to m-th sharing keys, one sharing key $K_{p,1}$ of the n sharing keys $K_{p,1}, \ldots, K_{p,n}$ and all the encrypted content items $E(K_1, C_1), \ldots, E(K_m, C_m), (K_p, C_p)$ with each other thereby to produce concatenated data $K_{1,1} \| \ldots \| K_{m,1} \| K_{p,1} \| E(K_1, C_1) \| \ldots \| E(K_m, C_m)$; a distribution sharing key generating device configured to individually concatenate the (n−1) sharing keys $K_{p,2}, \ldots, K_{p,n}$ other than the sharing key $K_{p,1}$ in the concatenated data included in the n sharing keys $K_{p,1}, \ldots, K_{p,n}$ for the sharing keys $K_{1,2}, \ldots, K_{m,2}$ constituting the other component of the first to m-th sharing keys, respectively, thereby to generate the first sharing key $K_{1,2}, K_{p,2}$ to the m-th sharing key $K_{m,2}, K_{p,n}$ for distribution; a sharing key storage device which stores the first sharing key $K_{1,2}, K_{p,2}$ to the m-th sharing key $K_{m,2}, K_{p,n}$; an output device configured to output the concatenated data $K_{1,1}\| \ldots \|K_{m,1}\|K_{p,1}\|E(K_1, C_1)\| \ldots \|E(K_m, C_m)$; and a sharing key distribution device configured to distribute the sharing key of the corresponding order in the sharing key storage device to the content browsing apparatus based on any of the first to m-th sharing key requests received from the content browsing apparatus.

In the first aspect, the first to (m−1)th encrypted content items $E(K_1, C_1\|K_{2,1}), \ldots, E(K_{m-1}, C_{m-1}\|K_{m,1})$ contain the second to m-th (next in order) sharing keys $K_{2,1}, \ldots, K_{m-1}$, respectively. In the case where the browsing of the (i+1)th content item $C_{i+1}$ is desired, for example, the (i+1)th sharing key $K_{i+1,1}$ can be obtained by browsing the immediately preceding i-th content item $C_i$. As a result, the content items can be browsed in the order intended by the content producer or the content browser.

In the second aspect, the first to m-th sharing keys $K_{1,2}, K_{p,2}, \ldots, K_{m,2}, K_{p,n}$ for distribution contain the sharing keys $K_{p,2} \ldots, K_{p,n}$ of different content items, respectively. In the case where the key information for a predetermined number of content items is acquired from among the first to m-th sharing keys, a different specified content item can also be browsed.

BRIEF DESCRIPTION OF THE SEVERAL VIEWS OF THE DRAWING

FIG. 3 is a schematic diagram showing the configuration of a user device according to the same embodiment;

FIG. 11 is a schematic diagram showing the relation between an encryption key and a sharing key according to the same embodiment;

FIGS. 12A, 12B and 12C are schematic diagrams showing the structure of key distribution data according to the same embodiment;

FIG. 15 is a schematic diagram showing the relation, in a generalized form, between the encryption key and the sharing key according to the same embodiment;

FIGS. 16A, 16B, 16C and 16D are schematic diagrams showing a generalized structure of the key distribution data according to the same embodiment;

FIG. 18 is a schematic diagram showing the relation between an encryption key and a sharing key according to the same embodiment;

FIG. 20 is a schematic diagram showing the structure of package data according to a fourth embodiment of the invention;

FIG. 21 is a schematic diagram showing the relation between an encryption key and a sharing key according to the same embodiment;

FIGS. 24A, 24B, 24C and 24D are schematic diagrams showing the structure of package data according to a sixth embodiment of the invention.

DETAILED DESCRIPTION OF THE INVENTION

Each embodiment of the invention will be explained below with reference to the drawings. Each device described below can be implemented either in hardware configuration or in any combination of hardware resources and software. The combined software configuration, as shown in FIGS. 1, 2, 3, 8 and 9, uses a program distributed from a network NW or storage media M10, M30 beforehand and installed in a distribution server unit 10 or a user device 30 for realizing the functions of the devices 10, 30.

The expressions used in each embodiment described below are shown in the table below.

| Characters | Description |
| --- | --- |
| $CID_i$ | Content ID number ($1 \leq i \leq m$; m is the number of content items) |
| $K_i$ | Encryption key for encrypting a content item ($1 \leq i \leq m$; m is the number of content items) |
| $KdID_L$ | ID number of the sharing key for the encryption key $K_i$ ($1 \leq L \leq m$; m is the number of content items) |
| $Kd_L$ | Sharing key for encryption key $K_i$ ($1 \leq L \leq m$; m is the number of content items) |
| $C_i$ | Content ($1 \leq i \leq m$; m is the number of content items) |
| $E(K, D)$ | Function of encrypting data D with key K |
| $C_p$ | Special content item |
| $K_p$ | Encryption key for encrypting special content item |
| $K_{i,j}$ | Sharing key for sharing secret of encryption key $K_i$ ($1 \leq i \leq m$; m is the number of content items, |

-continued

| Characters | Description |
|---|---|
| $K_{p,j}$ | $1 \leq j \leq k, 2 \leq k$; k is a threshold value for secret sharing) Sharing key for sharing secret of encryption key $K_p$ ($1 \leq i \leq k \leq n$, $2 \leq k$; k is a threshold value of secret sharing, and n the shared number of the secret sharing scheme) |

(First Embodiment)

Figure 1:
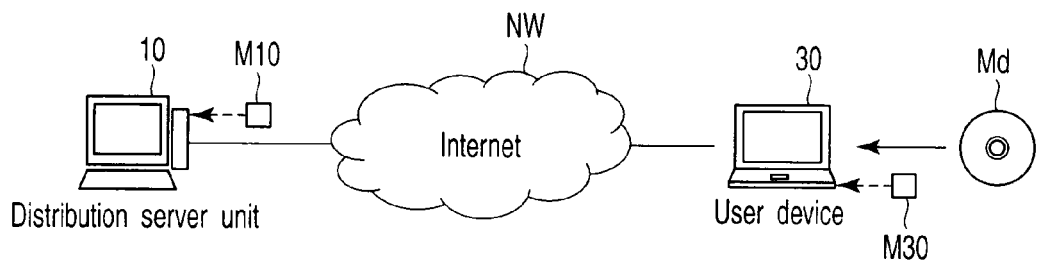
FIG. 1 is a schematic diagram showing the configuration of a content distribution/browsing system according to a first embodiment of the invention.
Figure 2:
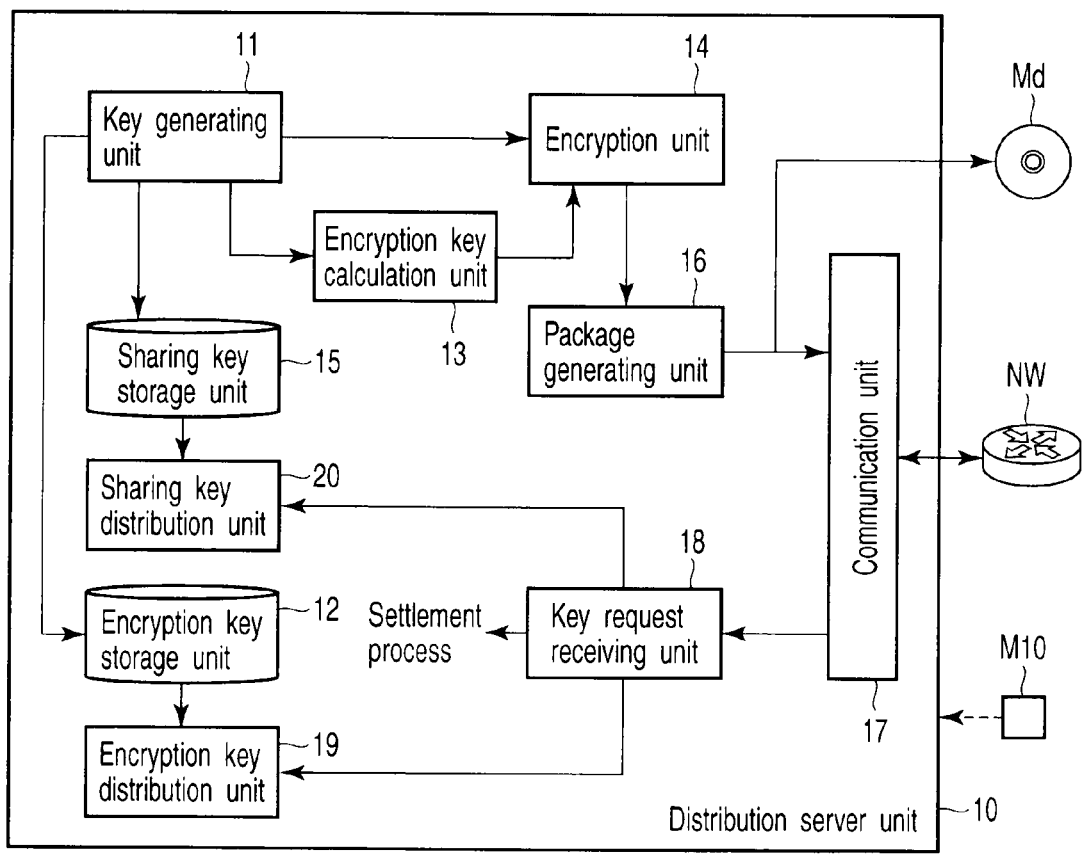
FIG. 2 is a schematic diagram showing the configuration of a distribution server unit according to the same embodiment.
Figure 4A:
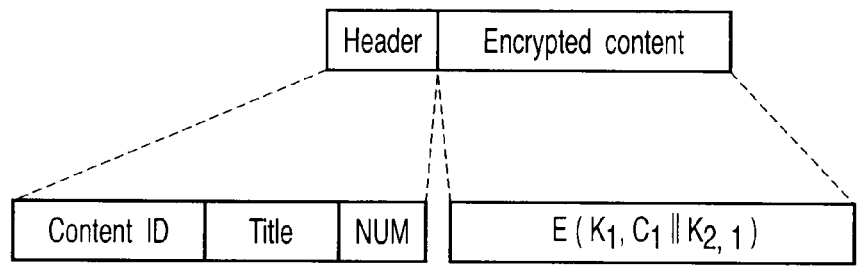
FIGS. 4A, 4B, 4C and 4D are schematic diagrams showing the structure of package data according to the same embodiment.
Figure 4B:
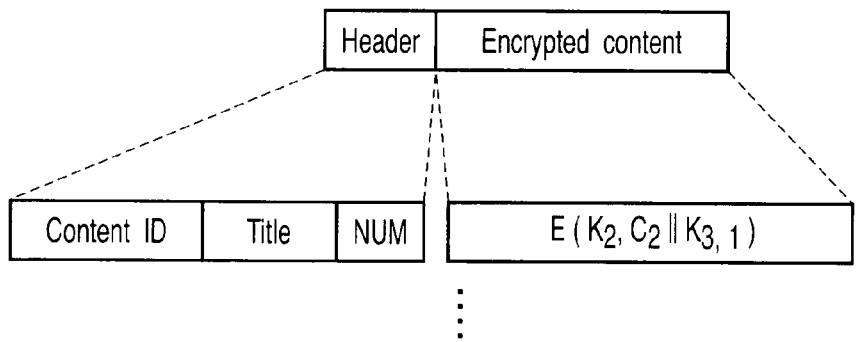
Figure 4C:
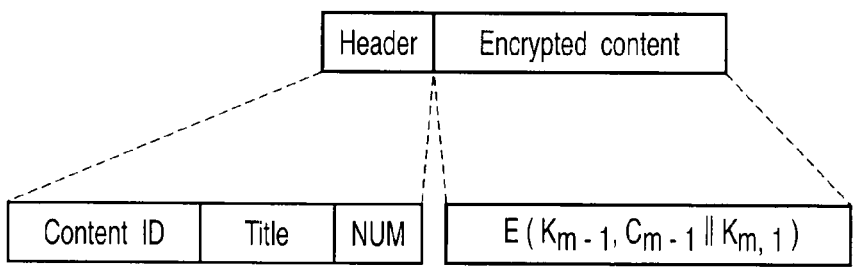
Figure 4D:
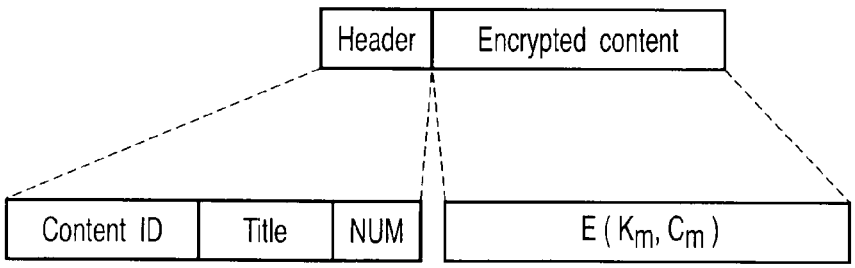

FIG. 1 is a schematic diagram showing the configuration of a content distribution/browsing system according to a first embodiment of the invention, FIG. 2 a schematic diagram showing the configuration of a distribution server unit of the same system, and FIG. 3 a schematic diagram showing the configuration of a user device of the system.

The content distribution/browsing system includes a distribution server unit 10 and a user device 30 communicable with each other through a network NW. In FIG. 1, a medium Md such as CD-ROM or DVD-ROM with the encrypted content items written therein is distributed to the user device 30. The encrypted content, however, may not necessarily be distributed by the medium Md but may be distributed from the distribution server unit 10 through the network NW. The network NW is assumed to be an open network such as the internet available for use by every person. For communication of confidential information such as key information between the user device 30 and the distribution server unit 10, therefore, the cryptographic communication method such as Secure Sockets Layer (SSL) is desirably used.

The distribution server unit 10 is a server-type multi-purpose computer having an operating system (OS) such as Windows™ or UNIX™ server working therein.

Specifically, the distribution server unit 10, as shown in FIG. 2, includes a key generating unit 11, an encryption key storage unit 12, an encryption key calculation unit 13, an encryption unit 14, a sharing key storage unit 15, a package generating unit 16, a communication unit 17, a key request receiving unit 18, an encryption key distribution unit 19 and a sharing key distribution unit 20.

The key generating unit 11 has the following functions (f11-1) to (f11-4):

(f11-1) The function of generating the first encryption key $K_1$ and the second to m-th sharing keys $K_{2,1}, K_{2,2}, \ldots, K_{m,1}, K_{m,2}$ in pairs for the first to m-th content items $C_1, \ldots, C_m$, respectively, by random number generation.

(f11-2) The function of sending out the first encryption key $K_1$ to the encryption unit 14 and writing the first encryption key $K_1$ in the encryption key storage unit 11.

(f11-3) The function of sending out the second to m-th sharing keys $K_{2,1}, K_{2,2}, \ldots, K_{m,1}, K_{m,2}$ to the encryption key calculation unit 13.

(f11-4) The function of writing one sharing key $K_{2,2}, \ldots, K_{m,2}$ in each of the second to m-th sharing key pairs in the sharing key storage unit 15.

The encryption key storage unit 12, writable by the key generating unit 11 and readable by the encryption key distribution unit 19, is for storing the first encryption key $K_1$.

The encryption key calculation unit 13 has the following functions (f13-1) and (f13-2):

(f13-1) The function of calculating the second to m-th encryption keys $K_2, \ldots, K_m$ based on the sharing keys in the same pairs $K_{2,1}, K_{2,2}, \ldots, K_{m,1}, K_{m,2}$, respectively, generated by the key generating unit 11.

(f13-2) The function of sending out the obtained encryption keys $K_2, \ldots, K_m$ to the encryption unit 14.

The encryption key calculation unit 13 calculates the second to m-th encryption keys $K_2, \ldots, K_m$ by the exclusive-OR operation of the sharing keys in the same one of the sharing key pairs $K_{2,1}, K_{2,2}, \ldots, K_{m,1}, K_{m,2}$. Specifically, $K_2=K_{2,1}(+)K_{2,2}$, $K_3=K_{3,1}(+)K_{3,2}, \ldots, K_m=K_{m,1}(+)K_{m,2}$, where (+) indicates the exclusive-OR operation. Thus, according to this embodiment, the encryption key $K_i$ (0<i) is generated by a method in which two random numbers having the same bit length as the encryption key $K_i$ are generated as a sharing key pair $K_{i,1}, K_{i,2}$, and by the exclusive-OR operation of these two sharing keys, the encryption key $K_i$ is generated as $K_{i,1}(+)K_{i,2}=K_2$.

According to each of the other embodiments, one encryption key may be obtained from each sharing key pair. As an alternative, an encryption key may be generated in advance, for example, and secretly distributed into n sharing key pairs by the (2, n)-threshold secret sharing scheme. The method using this secret sharing scheme will be explained later with reference to the second embodiment.

The encryption unit 14 has the following functions (f14-1) to (f14-4):

(f14-1) The function of concatenating each of the first to (m−1)th content items $C_1, \ldots, C_{m-1}$ with the first one of the sharing keys $K_{2,1}, \ldots, K_{m,1}$ of the second to m-th sharing key pairs, respectively, thereby to produce the first to (m−1)th concatenated data $C_1\|K_{2,1}, \ldots, C_{m-1}\|K_{m,1}$.

(f14-2) The function of encrypting the first to (m−1)th concatenated data $C_1\|K_{2,1}, \ldots, C_{m-1}\|K_{m,1}$ based on the first to (m−1)th encryption keys $K_1, \ldots, K_{m-1}$, respectively, thereby to obtain the first to (m−1)th encrypted content items $E(K_1, C_1\|K_{2,1}), E(K_{m-1}, C_{m-1}\|K_{m,1})$.

(f14-3) The function of encrypting the m-th content item $C_m$ based on the m-th encryption key $K_m$ thereby to obtain the m-th encrypted content item $E(K_m, C_m)$.

(f14-4) The function of sending out the encrypted content items $E(K_1, C_1\|K_{2,1}), E(K_{m-1}, C_{m-1}\|K_{m,1}), E(K_m, C_m)$ thus obtained to the package generating unit 16.

Incidentally, the content items are encrypted using the common key password such as Advanced Encryption Standard (AES). Also, the symbol "∥" indicates the concatenation. Further, the content items $C_1, \ldots, C_m$ may be read from either an external storage medium (not shown) or a storage unit (not shown) in the distribution server unit 10.

The sharing key storage unit 15, writable by the key generating unit 11 and readable by the sharing key distribution unit 20, is for storing the second sharing keys $K_{2,2}, \ldots, K_{m,2}$ of the second to m-th sharing key pairs.

The package generating unit 16 has the following functions (f16-1) and (f16-2):

(f16-1) The function of generating m package data based on the m encrypted content items $E(K_1, C_1\|K_{2,1}), \ldots, E(K_{m-1}, C_{m-1}\|K_{m,1}), E(K_m, C_m)$ received from the encryption unit 14.

(f16-2) The function of outputting each package data to the medium Md or the communication unit 17.

Each package data, as shown in FIGS. 4A, 4B, 4C and 4D, includes the header information and the encrypted content. The header information includes the header length, the content ID, the title and the NUM value (the value indicating how many preceding encrypted content items exist).

The communication unit 17 has the function as a communication interface between the distribution server unit 30 and the network NW.

The key request receiving unit 18 has the following functions (f18-1) to (f18-3):

(f18-1) The function of judging whether a key request received from the user device 30 through the communication unit 17 is a sharing key request or not based on the content ID and the key type information contained in the key request. The key type information indicates whether a given key is an encryption key or a sharing key.

(f18-2) The function of inputting the key request to the sharing key distribution unit 20 in the case where the judgment shows a sharing key request, and inputting the key request to the encryption key distribution unit 19 otherwise.

(f18-3) The function of executing the settlement process in accordance with the key request.

In the settlement process, the settlement price for the key request constituting an encryption key request is assumed to be different from the settlement price for the key request constituting a sharing key request. Also, the settlement process is assumed to be executed according to the credit card number of the user registered in advance.

Figure 5A:
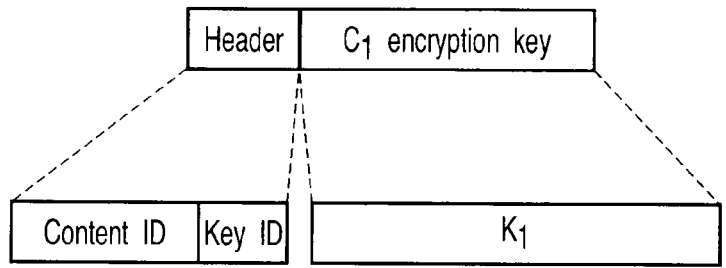
FIGS. 5A, 5B, 5C and 5D are schematic diagrams showing the structure of key distribution data according to the same embodiment.

The encryption key distribution unit 19 has the function of distributing the encryption key $K_1$ in the encryption key storage unit 12, together with the header information, to the user device 30 as key distribution data, as shown in FIG. 5A, based on the encryption key request received from the user device 30 through the key request receiving unit 18. The header information includes the content ID and the key ID corresponding to the encryption key $K_i$ distributed.

Figure 5B:
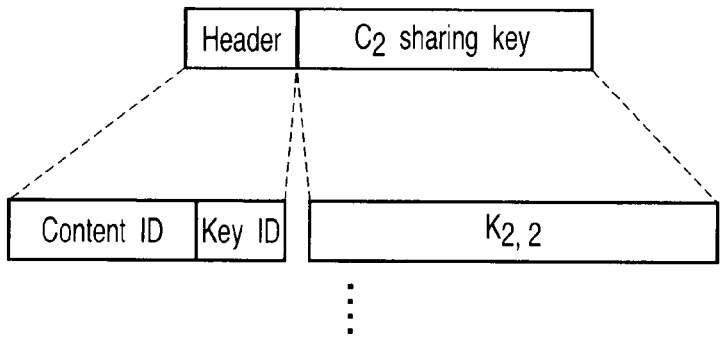
Figure 5C:
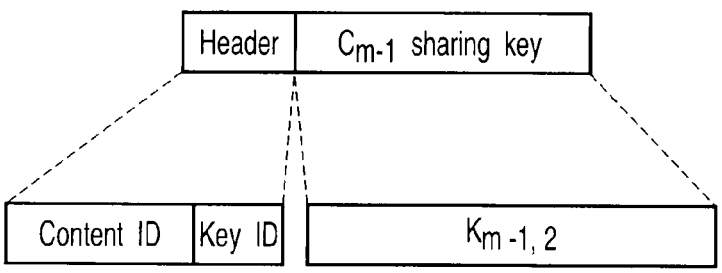
Figure 5D:
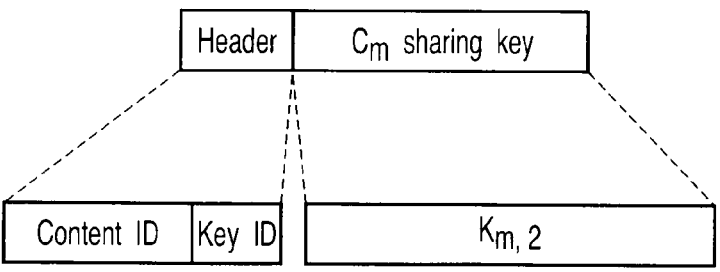

The sharing key distribution unit 20 has the function of distributing the sharing keys in the corresponding order in the sharing key storage unit 15, together with the header information, as key distribution data to the user device 30, as shown in FIGS. 5B, 5C and 5D, based on any one of the second to m-th sharing key requests received from the user device 30 through the key request receiving unit 18. The header information includes the content ID and the key ID corresponding to the sharing keys $K_{2,2}, \ldots, K_{m,2}$ distributed.

The user device 30 is a multi-purpose computer such as a personal computer (hereinafter referred to as PC). Specifically, the user device 30 includes a content requesting/receiving unit 31, a communication unit 32, an encrypted content storage unit 33, a content management unit 34, a key requesting/receiving unit 35, a key storage unit 36, an encrypted content decryption unit 37, a content browsing unit 38 and a sharing key restoration unit 39. Incidentally, the key storage unit 36, the encrypted content decryption unit 37 and the sharing key restoration unit 39 are preferably mounted as a tamperproof area 40.

The content requesting/receiving unit 31 has the following functions (f31-1) and (f31-2):

(f31-1) The function of requesting the package data from the distribution server unit 10 through the communication unit 32 by the user operation.

(f31-2) The function of writing, in the encrypted content storage unit 33, the package data received from the distribution server unit 10 through the communication unit 32.

The content requesting/receiving unit 31 may download the encrypted content from the distribution server unit 10 through the network, or read the encrypted content from a medium Md such as CD-ROM or DVD-ROM. The medium Md may be acquired by the user as a privilege such as a supplement of a magazine.

In the case where the encrypted content is acquired from the medium Md, the content requesting/receiving unit 31 such as CD drive or DVD drive stores the data read from the medium Md in the encrypted content storage unit 33 making up a storage medium such as a hard disk.

The communication unit 32 has the function as an communication interface between the user device 30 and the network NW.

The encrypted content storage unit 33, writable by the content requesting/receiving unit 31 and readable by the content management unit 34 and the encrypted content decryption unit 37, is thus adapted to store the package data containing the first and second to m-th encrypted content items $E(K_1, C_1\|K_{2,1})$, $E(K_2, C_2\|K_{3,1})$, ..., $E(K_{m-1}, C_{m-1}\|K_{m,1})$, $E(K_m, C_m)$ individually.

The content management unit 34 has the function of managing the encrypted content items and the browsable content items by accessing the encrypted content storage unit 33 and the key storage unit 36.

The key requesting/receiving unit 35 has the following functions (f35-1) to (f35-3):

(f35-1) The function of transmitting an encryption key request to the distribution server unit 10 through the communication unit 32 and receiving the first encryption key $K_1$ from the distribution server unit 10 by user operation.

(f35-2) The function of transmitting the request for the (i+1)th sharing key to the distribution server unit 10 by user operation and receiving the sharing key $K_{i+1,2}$ from the distribution server unit 10 in the case where the i-th content item $C_i$ browsed is not the m-th content item $C_m$.

(f35-3) The function of writing the received encryption key $K_1$ or the sharing key $K_{i+1,2}$ into the key storage unit 36.

The key storage unit 36, writable by the key requesting/receiving unit 35, the encrypted content decryption unit 37 and the sharing key restoration unit 39 and readable by the content management unit 34, the encrypted content decryption unit 37 and the sharing key restoration unit 39, is for storing the encryption keys $K_1$ to $K_m$ and the sharing key pairs $K_{2,1}, K_{2,2}, \ldots, K_{i,1}, K_{i,2}, K_{+1,1}, K_{i+1,2}, \ldots, K_{m,1}, K_{m,2}$.

The encrypted content decryption unit 37 has the following functions (f37-1) and (f37-2):

(f37-1) The function of decrypting the corresponding i-th encrypted content item $E(K_1, C_1\|K_{i+1,1})$ or $E(K_m, C_m)$ in the encrypted content storage unit 33 based on the encryption key $K_i$ input from the sharing key restoration unit 39 (i=1, 2, ... i, i+1, ..., or m).

(f37-2) The function of sending out the obtained content item $C_i$ or $C_m$ to the content browsing unit 38.

The content browsing unit 38 has the reproducing function to browse the content item $C_i$ or $C_m$ received from the encrypted content decryption unit 37.

The sharing key restoration unit 39 has the function of restoring the (i+1)th encryption key $K_{i+1}$ based on the sharing key $K_{i+1,2}$ in the key storage unit 36 and the (i+1)th sharing key $K_{i+1,1}$ obtained from the encrypted content decryption unit 37, and inputting the obtained encryption key $K_{i+1}$ to the encrypted content decryption unit 37.

Figure 6:
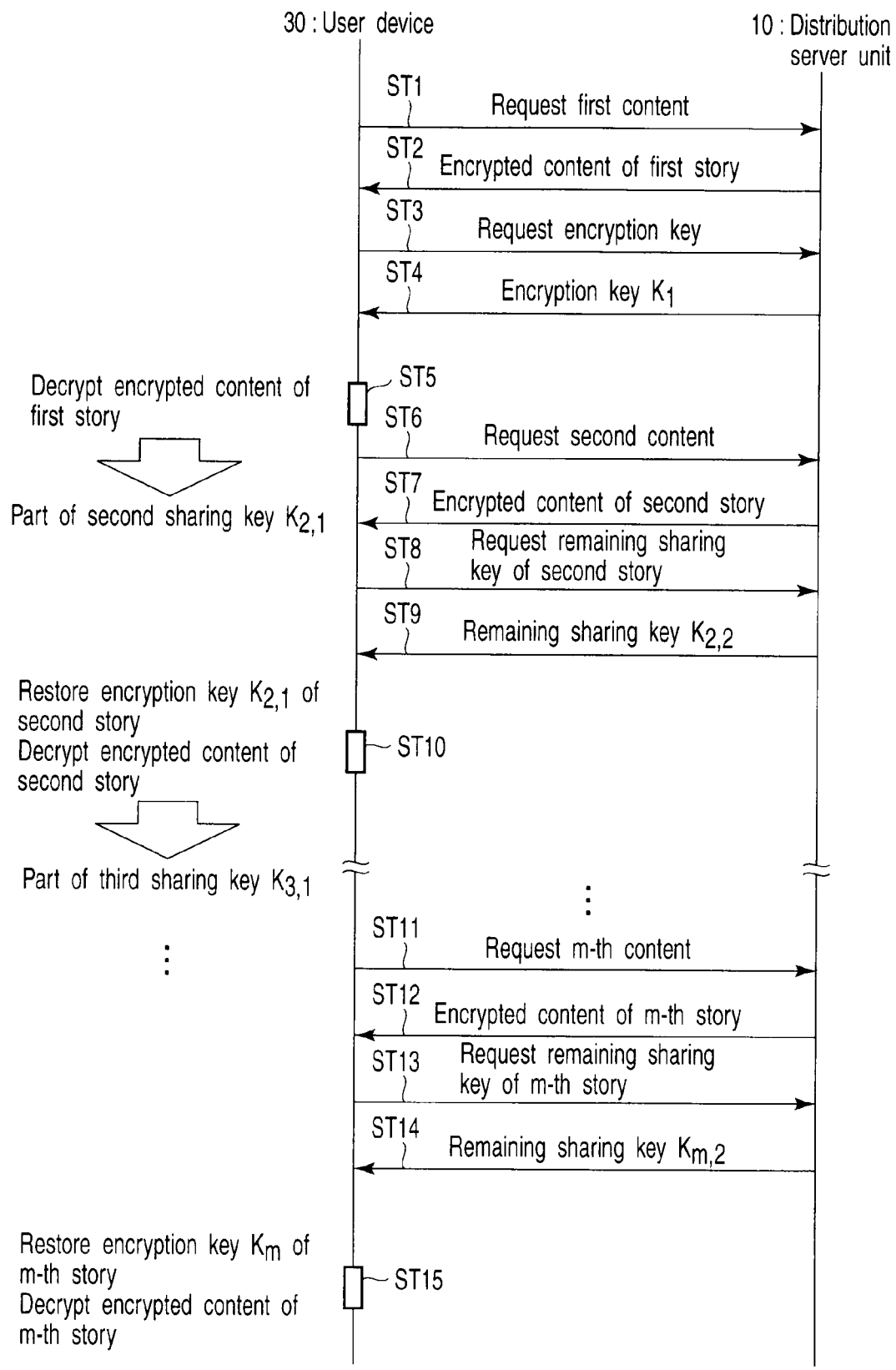
FIG. 6 is a sequence chart for explaining the operation according to the same embodiment.

Next, the operation of the content distribution/browsing system having the aforementioned configuration will be explained with reference to the sequence diagram of FIG. 6. In the description that follows, the first encrypted content item is regarded as that of the first story, and similarly, the i-th encrypted content item as the encrypted content of the i-th story.

In the user device 30, the content requesting/receiving unit 31 sends, by user operation, a first content request to the distribution server unit 10 for requesting the package data including the encrypted content of the first story (ST1).

In the distribution server unit 10, the package generating unit 16, based on the first content request, transmits the package data including the encrypted content item $E(K_1, C_1\|K_{2,1})$ of the first story from the communication unit 17 to the user device 30 (ST2).

In the user device 30, the content requesting/receiving unit 31, upon receipt of the package data including the encrypted content item $E(K_1, C_1\|K_{2,1})$ of the first story, writes the particular package data in the encrypted content storage unit 33.

Also, in the user device 30, the key requesting/receiving unit 35 transmits, by user operation, an ID encryption key request including the content ID and the key type information for requesting the encryption key $K_1$ corresponding to the encrypted content of the first story, to the distribution server unit 10 (ST3).

In the distribution server unit 10, the key request receiving unit 18 judges whether the received encryption key request is a sharing key request or not, and, the judgment being negative, inputs the particular encryption key request to the encryption key distribution unit 19. The encryption key distribution unit 19, based on the encryption key request, distributes the encryption key $K_1$ in the encryption key storage unit 12, together with the header information, to the user device 30 as key distribution data.

In the user device 30, upon receipt of the encryption key $K_1$ (ST4), the key requesting/receiving unit 35 writes the encryption key $K_1$ in the key storage unit 36. Also, the encrypted content decryption unit 37 decrypts the encrypted content item $E(K_1, C_1\|K_{2,1})$ of the first story in the encrypted content storage unit 33 based on the encryption key $K_1$ in the key storage unit 36 thereby to acquire the content item $C_1$ of the first story and the sharing key $K_{2,1}$ of the second story (ST5). The encrypted content decryption unit 37 sends out this content item $C_1$ to the content browsing unit 38 while at the same time writing the sharing key $K_{2,1}$ of the second story in the key storage unit 36.

As a result, the content browsing unit 38 of the user device 30 reproduces and browses the content item $C_1$ of the first story.

Next, in the case where the browsing of the content item $C_2$ of the second story is desired, the content requesting/receiving unit 31 sends the second content request of the encrypted content of the second story to the distribution server unit 10 in the same manner as described above (ST6), and by receiving the encrypted content item $E(K_2, C_2\|K_{3,1})$ of the second story from the distribution server unit 10 (ST7), writes it in the encrypted content storage unit 33.

The key requesting/receiving unit 35 of the user device 30 then sends a sharing key request for the remaining sharing key $K_{2,2}$ of the second story to the distribution server unit 10 by user operation (ST8), and by receiving the sharing key $K_{2,2}$ from the distribution server unit 10 (ST9), writes it in the key storage unit 36.

The sharing key restoration unit 39 of the user device 30 restores the encryption key $K_2$ of the second story by the exclusive-OR operation between the sharing key $K_{2,2}$ and the sharing key $K_{2,1}$ of the second story obtained at the time of decoding the first story, and sends the encryption key $K_2$ to the encrypted content decryption unit 37.

After that, the encrypted content decryption unit 37 of the user device 30, based on the encryption key $K_2$ of the second story, decrypts the encrypted content item $E(K_2, C_2\|K_{3,1})$ of the second story thereby to acquire the content item $C_2$ of the second story and the sharing key $K_{3,1}$ of the third story (ST10).

In this way, the user device 30 reproduces and browses the content item $C_2$ of the second story.

In similar fashion, the user device 30 executes the process similar to steps ST6 to ST10 at the time of browsing the content items $C_3, \ldots, C_{m-1}$ of the third to (m−1)th stories and thus reproduces and browses the content items $C_3$ to $C_{m-1}$.

Finally, whenever it is desired to browse the content item $C_m$ of the m-th story, the m-th content request for the encrypted content of the m-th story is transmitted to the distribution server unit 10 (ST11) and the encrypted content item $E(K_m, C_m)$ of the m-th story is received from the distribution server unit 10 (ST12).

The user device 30 then transmits the sharing key request for the remaining sharing key $K_{m,2}$ of the m-th story to the distribution server unit 10 (ST13) and receives the sharing key $K_{m,2}$ (ST14). The user device 30 restores the encryption key $K_m$ of the m-th story by the exclusive-OR operation between the sharing key $K_{m,2}$ and the sharing key $K_{m,1}$ of the m-th story acquired at the time of restoring the (m−1)th story. After that, the user device 30, based on the encryption key $K_m$ of the m-th story, decrypts the encrypted content item $E(K_m, C_m)$ of the m-th story and thus acquires the content item $C_m$ of the m-th story (ST15). In this way, the user device 30 reproduces and browses the content item $C_m$ of the m-th story.

As described above, the user device 30 cannot acquire the first one sharing key of the sharing key pair for the next decryption without browsing the serial content items such as a drama in correct order. Incidentally, in order to skip the order, the encryption key must be requested to decrypt the encrypted content.

Assume, for example, that the user device 30 has not browsed at least the immediately preceding content item $C_{m-1}$ when the user desires to browse the content item $C_m$ of the m-th story. The user device 30 has not acquired the sharing key $K_{m,1}$ included in the immediately preceding encrypted content item $E(K_{m-1}, C_{m-1}\|K_{m,1})$. Even in the case where the second sharing key $K_{m,2}$ is acquired by the sharing key request, therefore, the encryption key $K_m$ cannot be restored. Thus, the encrypted content item $E(K_m, C_m)$ cannot be decrypted. For this reason, the encryption key $K_m$ is required to be requested directly.

Figure 7:
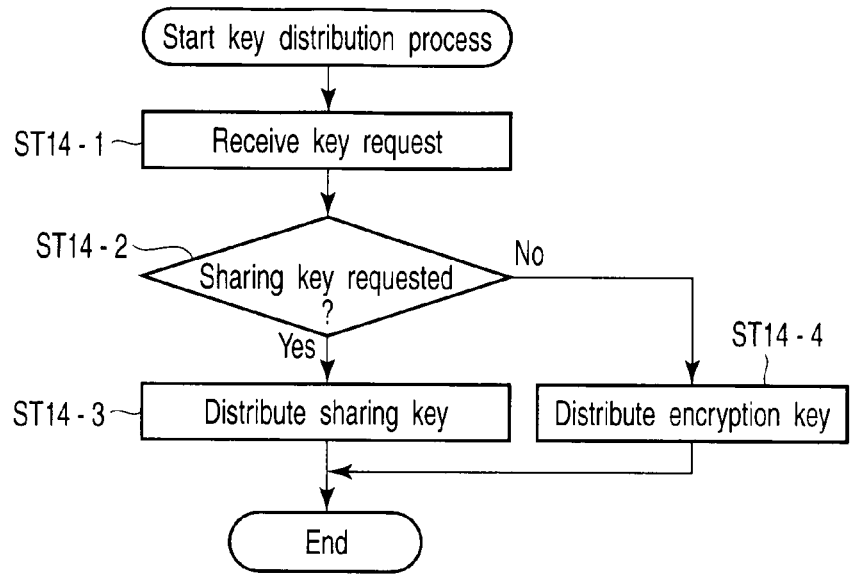
FIG. 7 is a flowchart for explaining how to judge a key request according to the same embodiment.

In the case where the skipping of the order is desired as described above, the distribution server unit 10, as shown in FIG. 7, executes the process of judging whether a sharing key request is involved or not. Assume, for example, that the user desirous of browsing the content item $C_m$ of the m-th story has not browsed at least the immediately preceding content item $C_{m-1}$.

Specifically, the distribution server unit 10, upon receipt of the key request from the user device 30 (ST14-1), judges whether the particular key request is a sharing key request or not based on the content ID and the key type information included in the key request (ST14-2), and in the case where the judgment shows that it is the sharing key request, inputs the particular key request to the sharing key distribution unit 20 (ST14-3). In the case where the key request is not the sharing key request, on the other hand, the key request is input to the encryption key distribution unit 19 (ST14-4). After that, the distribution server unit 10 executes the settlement process in response to the key request.

The user device 30 thus transmits the sharing key request when browsing in right order, and transmits the encryption key request when desirous of browsing by skipping the order. In this way, the user device 30, while browsing in order normally, can browse by skipping the order when desired.

As described above, according to this embodiment, the first to (m−1)th encrypted content items $E(K_1, C_1\|K_{2,1}), \ldots, E(K_{m-1}, C_{m-1}\|K_{m,1})$ include the second to m-th (next in order) sharing keys $K_{2,1}, \ldots, K_{m,1}$, respectively. In the case where it is desired to browse the (i+1)th content item $C_{i+1}$, therefore, the (i+1)th sharing key $K_{i+1,1}$ can be obtained by browsing the immediately preceding i-th content item $C_i$. Thus, the content items can be browsed in the order intended by the content producer or the content browser.

Also, the user device 30 transmits a sharing key request when browsing in regular order, while in the case where the browsing by skipping the order is desired, transmits an encryption key request. In this way, the orderly browsing is carried out normally, while the order can be skipped as desired.

Incidentally, the distribution server unit 10, having such a configuration as to judge whether the key request received from the user device 30 is an encryption key request or a sharing key request, can distinguish both the key to be distributed and the settlement process, thereby eliminating the need of managing the information such as the content items already browsed by the user. Also, the settlement price can be reduced for the sharing key request for orderly browsing, and increased for the encryption key request for browsing by skipping.

(Second Embodiment)

Figure 8:
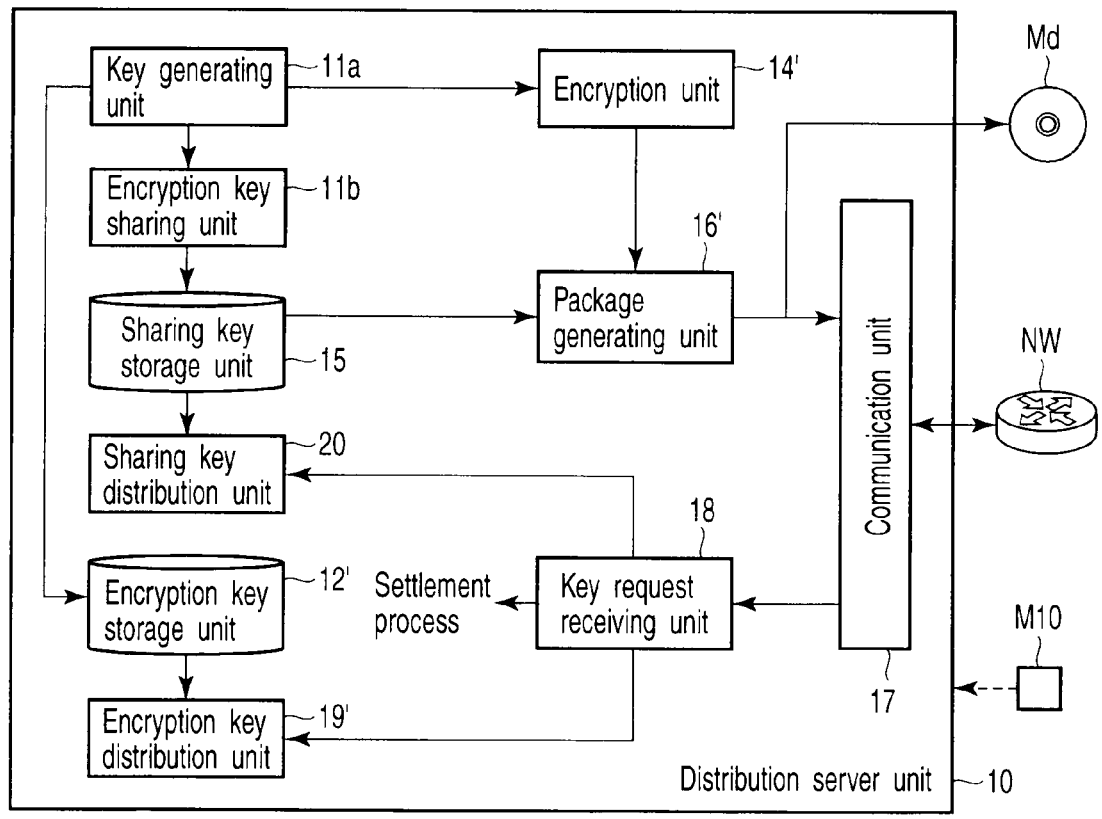
FIG. 8 is a schematic diagram showing the configuration of a distribution server unit according to a second embodiment of the invention.
Figure 9:
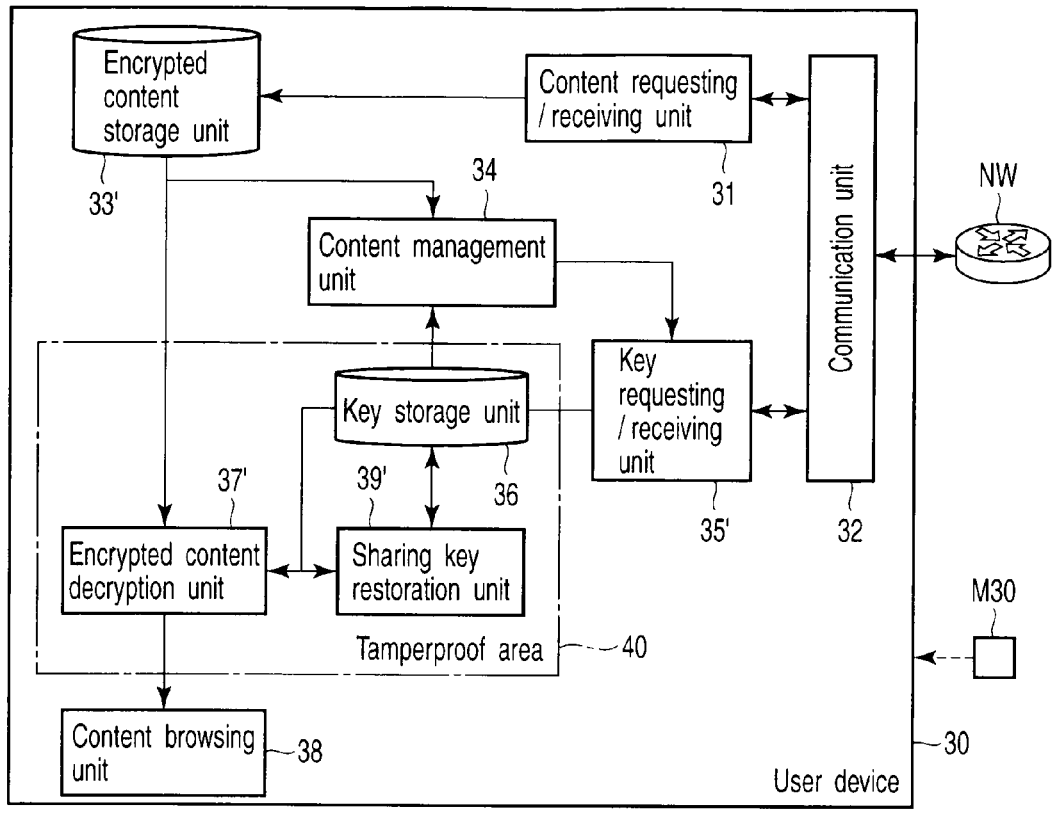
FIG. 9 is a schematic diagram showing the configuration of a user device according to the same embodiment.

FIG. 8 is a schematic diagram showing the configuration of a distribution server unit according to a second embodiment of the invention, and FIG. 9 a schematic diagram showing the configuration of a user device according to the same embodiment. In these diagrams, the same component parts as those in FIGS. 1 to 3 are designated by the same reference numerals, respectively, and not described in detail, while only different component parts will be mainly described below. This applies to all the other embodiments described below.

Figure 10:
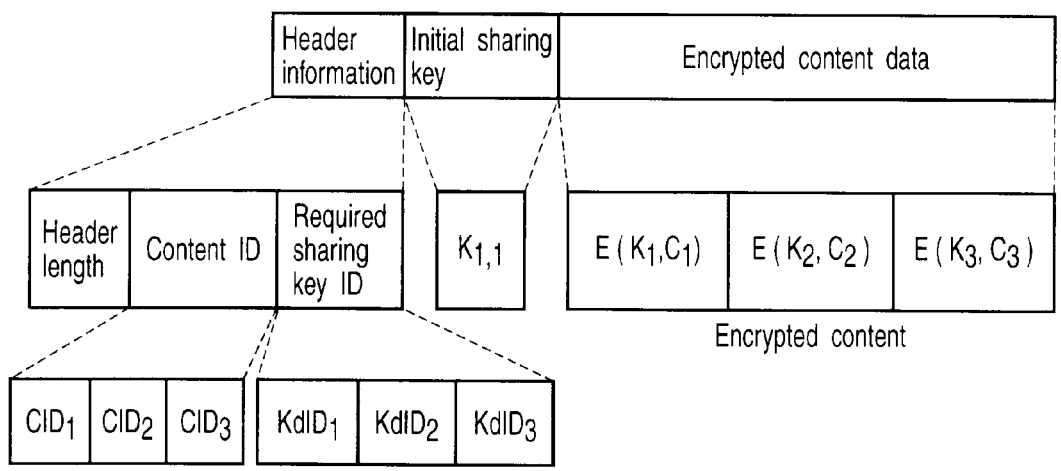
FIG. 10 is a schematic diagram showing the structure of package data according to the same embodiment.

Specifically, according to this embodiment, unlike in the first embodiment in which the encrypted content items in each order are individually acquired, all the encrypted content items are collectively acquired as shown in FIG. 10. Incidentally, the encryption key $K_i$ and the sharing key pair $K_{i,1}$, $K_{i,2}$ hold the same relation in this embodiment as in the first embodiment except that, as shown in FIG. 11, the first encryption key $K_1$ is also shared by the sharing key pair $K_{1,2}$, $K_{2,2}$. Also, the data structure of the sharing key information, as shown in FIGS. 12A, 12B, is configured of the header information (content ID and key ID), and two sharing keys (the present sharing key $K_{i,2}$ and the next sharing key $K_{i+1,2}$) (i=1, 2, 3). In the case where the present session is the last one, however, the lack of the next session leads to the configuration, as shown in FIG. 12C, including the header information (content ID and key ID) and one sharing key (sharing key $K_{m,2}$ for the last session) (m=3).

The distribution server unit 10 includes a key generating unit 11a, an encryption key sharing unit 11b, an encryption key storage unit 12', an encryption unit 14', a sharing key storage unit 15, a package generating unit 16', a communication unit 17, a key request receiving unit 18, an encryption key distribution unit 19 and a sharing key distribution unit 20.

The key generating unit 11a has the following functions (f11a-1) to (f11a-3), where m=3:

(f11a-1) The function of generating the first to m-th encryption keys $K_1$ to $K_m$ for the first to m-th content items $C_1$ to $C_m$, respectively.

(f11a-2) The function of writing the encryption keys $K_1$ to $K_m$ in the encryption key storage unit 12'.

(f11a-3) The function of sending out the encryption keys $K_1$ to $K_m$ to the encryption key sharing unit 11b.

The encryption key sharing unit 11b has the following functions (f11b-1) and (f11b-2), where m=3, and n=3:

(f11b-1) The function of generating the first to m-th sharing keys $K_{1,1}, K_{1,2}, \ldots, K_{1,n}, \ldots, K_{m,1}, K_{m,2}, \ldots, K_{m,n}$ as sets of n sharing keys according to the (2, n)-threshold secret sharing scheme for the first to m-th encryption keys $K_1, \ldots, K_m$, respectively.

(f11b-2) The function of writing the sharing keys $K_{1,1}, K_{1,2}, \ldots, K_{1,n}, \ldots, K_{m,1}, K_{m,2}, \ldots, K_{m,n}$ in the sharing key storage unit 15.

The (2, n)-threshold secret sharing scheme is a version of the (k, n)-threshold secret sharing scheme in which the threshold value k is set to 2. According to the (k, n)-threshold secret sharing scheme, the original information before distribution can be acquired by collecting k out of n distributed information. According to this embodiment, the secret sharing scheme employed has not necessarily the relation k<n, but the scheme called "all or nothing transform" having the relation k=n may be employed. Thus, the algorithm of the secret sharing scheme is not specifically limited.

[Secret Sharing of Encryption Key $K_i$]

In preparation, the threshold value k is set to 2 and the sharing number n to 3.

Assume that the secret encryption key is $K_i$, and using the Shamir's secret sharing scheme, the primary polynomial $f(x) = ax + K_i \pmod{p}$ as shown below is generated, where (mod p) is the remainder after division by p and larger than the encryption key $K_i$ and a coefficient a.

$$f(1) = a + K_i (\bmod\, p)$$

$$f(2) = 2a + K_i (\bmod\, p)$$

$$f(3) = 3a + K_i (\bmod\, p)$$

In the encryption key sharing unit 11b, $f(1)$, $f(2)$, $f(3)$ are determined as sharing keys $K_{i,1}$, $K_{i,2}$ and $K_{i,3}$, respectively, and written in the sharing key storage unit 11b.

In the case where this secret sharing scheme is used, the original encryption key $K_i$ can be restored by acquiring the sharing keys $K_{i,1}$ and $K_{i,2}$ constituting two threshold values among the three distributed sharing keys. The encryption key $K_i$ is restored by the sharing key restoration unit 39' of the user device 30 as described below.

[Restoration of Encryption Key $K_i$]

As a specific example, an explanation will be given with reference to the algorithm of Shamir's (k, n)-threshold secret sharing scheme described above. In the user device 30, the sharing restoration unit 39' reads, from the key storage unit 36, the sharing key $K_{i,2}$ received from the distribution server unit 10 and another sharing key $K_{i,1}$ distributed at the time of the previous browsing session. The sharing key restoration unit 39' determines the encryption key $K_i$ using the algorithm of the secret sharing scheme from the equations below.

$$K_{i,1} = f(1) = a + Ki (\bmod\, p)$$

$$K_{i,2} = f(2) = 2a + K_i (\bmod\, p)$$

In this case, the encryption key $K_i$ is determined by solving these two simultaneous equations. The algorithm of the secret sharing scheme is used as described above.

The encryption key storage unit 12', writable by the key generating unit 11a and readable by the encryption key distribution unit 19, is for storing the encryption keys $K_1$ to $K_m$.

The encryption unit 14' has the following functions (f14'-1) and (f14'-2):

(f14'-1) The function of encrypting the first to m-th content items $C_1$ to $C_m$ based on the encryption keys $K_1$ to $K_m$, respectively, thereby to produce the first to m-th encrypted content items $E(K_1, C_1), \ldots, E(K_m, C_m)$.

(f14'-2) The function of sending out the encrypted content items thus obtained to the package generating unit 16'.

The sharing key storage unit 15, writable by the encryption key sharing unit 1ib and readable by the sharing key distribution unit 20, is for storing the sharing keys $K_{1,1}$, $K_{1,2}$, ..., $K_{1,n}$, ..., $K_{m,1}$, $K_{m,2}$, ..., $K_{m,n}$.

The package generating unit 16' has the following functions (f16'-1) to (f16'-3):

(f16'-1) The function of concatenating one sharing key $K_{1,1}$ of the first sharing key pair in the sharing key storage unit 15 with the encrypted content items $E(K_1, C_1)$, ..., $E(K_m, C_m)$ received from the encryption unit 14' and thereby obtaining the concatenated data $K_{1,1} \| E(K_1, C_1) \| ... \| E(K_m, C_m)$.

(f16'-2) The function of generating the package data based on the concatenated data.

(f16'-3) The function of outputting the package data to the medium Md or the communication unit 17.

The package data, as shown in the example of FIG. 10 in which m=3, includes the header information, the initial sharing key ($K_{1,1}$) and the encrypted content. The header information includes the header length, the content ID indicating the content item in the package data and the sharing key ID required for browsing. For the present purpose, assume that the content items $C_1$, $C_2$, $C_3$ representing three divisions, i.e., the first part, middle part and last part are contained in the package data.

Accordingly, the content ID of the header information includes three content IDs, i.e., $ID_1$, $ID_2$, $ID_3$. The sharing key ID required for browsing the three content items include $KdID_1$, $KdID_2$, $KdID_3$ as the sharing key ID indicating the first sharing key $Kd_1$, the second sharing key $Kd_2$ and the third sharing key $Kd_3$ as shown in FIG. 11. The sharing key $Kd_{1,1}$ is included as the initial sharing key $Kd_0$ of the package data.

Now, an explanation will be given about the initial sharing key $Kd_0$, and the first to third sharing keys $Kd_1$, $Kd_2$, $Kd_3$. According to this embodiment, the sharing keys $K_{1,1}$, $K_{1,2}$; $K_{2,1}$, $K_{2,2}$; $K_{3,1}$, $K_{3,2}$ having two threshold values are used for distribution, among the sharing keys $K_{1,1}$, $K_{1,2}$, $K_{1,3}$, the sharing keys $K_{2,1}$, $K_{2,2}$, $K_{2,3}$ and the sharing keys $K_{3,1}$, $K_{3,2}$, $K_{3,3}$, respectively, in the sharing key storage unit 15.

The first sharing key $K_{1,1}$ of the sharing key pair is used as the initial sharing key $Kd_0$ for distribution ($Kd_0 = K_{1,1}$). Also, the concatenated data of the first sharing key $K_{1,2}$ requested and one sharing key $K_{2,1}$ of the next sharing key pair is used as the first sharing key $Kd_1$ for distribution ($Kd_1 = K_{1,2} \| K_{2,1}$). Similarly, the concatenated data of one sharing key $K_{2,2}$ of the second sharing key pair requested and one sharing key $K_{3,1}$ of the third sharing key pair is used as the second sharing key $Kd_2$ for distribution ($Kd_2 = K_{2,2} \| K_{3,1}$). Thus, the remaining third sharing key $K_{3,2}$ is used as the third sharing key $Kd_3$ for distribution ($Kd_3 = K_{3,2}$).

The encrypted content data of the package data are configured of $E(K_1, C_1)$ with the content item $C_1$ encrypted by the encryption key $K_1$, $E(K_2, C_2)$ with the content item $C_2$ encrypted by the encryption key $K_2$ and $E(K_3, C_3)$ with the content item $C_3$ encrypted by the encryption key $K_3$.

The communication unit 17 and the key request receiving unit 18 are similar to those described above, respectively.

The encryption key distribution unit 19 has the function of distributing the corresponding i-th encryption key $K_i$ in the encryption key storage unit 12, together with the header information, to the user device 30 based on the encryption key request received from the user device 30 through the key request receiving unit 18. The header information contains the content ID and the key ID corresponding to the encryption key $K_i$ thus distributed.

The sharing key distribution unit 20 has the function of distributing the corresponding next sharing key in the sharing key storage unit 15, together with the header information, to the user device 30, as shown in FIGS. 12A, 12B and 12C, based on any one of the first to third sharing key requests received from the user device 30 through the key request receiving unit 18. The header information contains the content ID and the key ID corresponding to the distributed sharing key (either $K_{1,2}$, $K_{2,1}$ or $K_{2,2}$, $K_{3,1}$, or $K_{3,2}$).

The user device 30, on the other hand, includes a content requesting/receiving unit 31, a communication unit 32, an encrypted content storage unit 33', a content management unit 34, a key requesting/receiving unit 35', a key storage unit 36, an encrypted content decryption unit 37', a content browsing unit 38 and a sharing key restoration unit 39'. Incidentally, the key storage unit 36, the encrypted content decryption unit 37' and the sharing key restoration unit 39' are desirably packaged as a tamperproof area 40.

The content requesting/receiving unit 31, the communication unit 32, the content management unit 34 and the content browsing unit 38 have the function similar to those described above, respectively.

The encrypted content storage unit 33', writable by the content requesting/receiving unit 31 and readable by the content management unit 34 and the encrypted content decryption unit 37, is for storing the package data containing the concatenated data $K_{1,1} \| E(K_1, C_1) \| ... \| E(K_3, C_3)$.

The key requesting/receiving unit 35' has the following functions (f35'-1) and (f35'-2):

(f35'-1) The function of transmitting the i-th sharing key request or encryption key request to the distribution server unit 10 through the communication unit 32 and receiving the sharing keys $K_{i,2}$, $K_{i+1,1}$ or the encryption key $K_i$ from the distribution server unit 10 by user operation.

(f35'-2) The function of writing the received sharing keys $K_{i,2}$, $K_{i+1,1}$ or the encryption key $K_i$ in the key storage unit 36.

The key storage unit 36, writable by the key requesting/receiving unit 35, the encrypted content decryption unit 37 and the sharing key restoration unit 39 and readable by the content management unit 34 and the sharing key restoration unit 39, is for storing the encryption keys $K_1$, $K_2$, $K_3$ and the sharing keys $K_{1,1}$, $K_{1,2}$, $K_{2,1}$, $K_{2,2}$, $K_{3,1}$, $K_{3,2}$.

The encrypted content decryption unit 37' has the following functions (f37'-1) to (f37'-4):

(f37'-1) The function of reading the i-th encrypted content item $E(K_i, C_i)$ as desired to browse from the encrypted content storage unit 33'.

(f37'-2) The function of reading the sharing key $K_{1,1}$ from the encrypted content storage unit 33' and writing it in the key storage unit 36 when i=1.

(f37'-3) The function of decrypting the corresponding i-th encrypted content item $E(K_i, C_i)$ in the encrypted content storage unit 33 based on the encryption key $K_i$ input from the sharing key restoration unit 39.

(f37'-4) The function of sending out the obtained content item $C_i$ to the content browsing unit 38.

The sharing key restoration unit 39' has the function of restoring the i-th encryption key $K_i$ based on the sharing keys $K_{i,1}$, $K_{i,2}$ in the key storage unit 36 and inputting the encryption key $K_i$ thus obtained into the encrypted content decryption unit 37.

Figure 13:
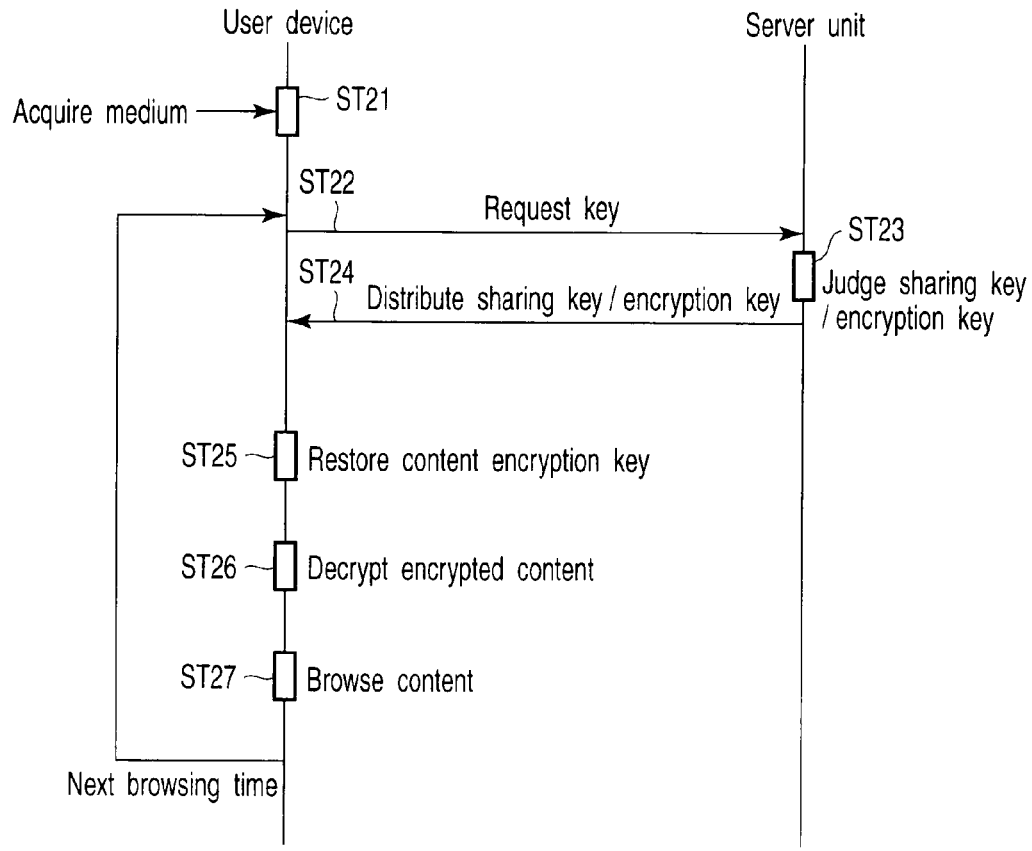
FIG. 13 is a sequence chart for explaining the operation according to the same embodiment.
Figure 14:
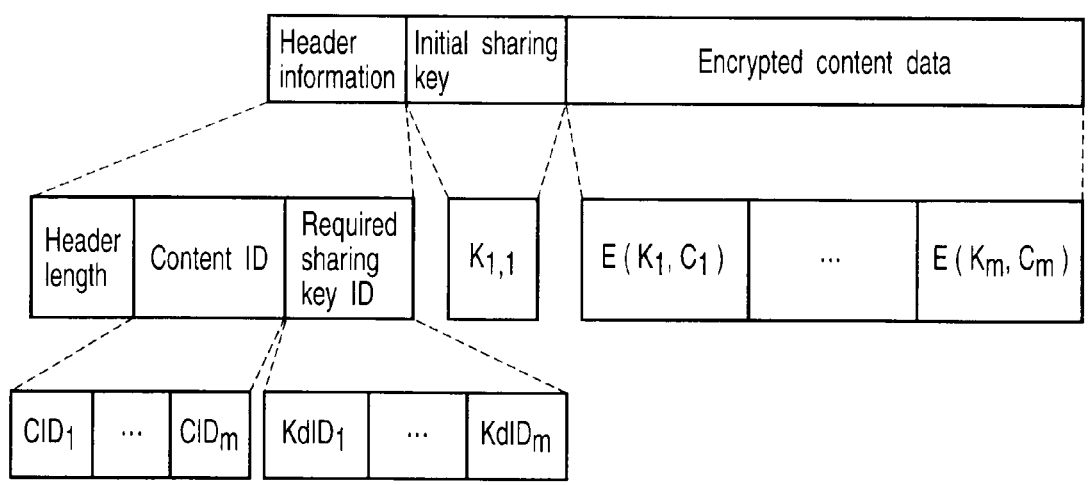
FIG. 14 is a schematic diagram showing a generalized data structure of the package data according to the same embodiment.

Next, the operation of the content distribution/browsing system having the aforementioned configuration will be explained with reference to the sequence chart of FIG. 13.

In the user device 30, the content requesting/receiving unit 31 acquires the package data including the encrypted content from the distribution server unit 10 through the medium Md or the network NW (ST21), and stores it as an encrypted content item in the encrypted content storage unit 33'.

In the user device 30, in order to browse the encrypted content, the content management unit 34 acquires the sharing key $IDKd_i$ required for browsing from the encrypted content in the encrypted content storage unit 33'. In the case where no content has been browsed as yet, only the initial sharing key $Kd_0$ is held, and therefore, the sharing key $IDKd_i$ of the first sharing key $Kd_i$ is acquired.

After that, the key requesting/receiving unit 35' of the user device 30 transmits the sharing key request including the sharing key $IDKd_i$ for requesting the i-th sharing key $Kd_i$ to the distribution server unit 10 (ST22). In the case where it is desired to browse the first content item (i=1), the sharing key request including the sharing key $IDKd_i$ for requesting the first sharing key $Kd_i$ is transmitted.

In the distribution server unit 10, the key request receiving unit 18 judges whether the key request is a sharing key request based on the sharing key $IDKd_i$ (ST22), and since the current judgment indicates a sharing key request, sends out the sharing key request to the sharing key distribution unit 20. The sharing key distribution unit 20, based on this sharing key request, distributes the key distribution data including the i-th sharing key $K_i$ to the user device 30 (ST24).

The user device 30 stores the acquired i-th sharing key $Kd_i = K_{i,2}, K_{i+1,1}$ in the key storage unit 36, while the sharing key restoration unit 39', based on the sharing key $K_{i,2}$ and the sharing key $K_{i,1}$ previously received, restores the encryption key $K_i$ (ST25) and sends out this encryption key $K_i$ to the encrypted content decryption unit 37'.

Incidentally, in the case where the judgment in step ST23 indicates an encryption key request, the key requesting unit 18 sends out an encryption key request to the encryption key distribution unit 19, which in turn distributes the encryption key $K_i$ to the user device 30 (ST24'). Then, the user device 30 stores the encryption key $K_i$ in the key storage unit 36. In this way, step ST25 is omitted, and the encrypted content decryption unit 37' reads the encryption key $K_i$ from the key storage unit 36.

The encryption key restoration unit 37', based on this encryption key $K_i$, decrypts the encrypted content item $E(K_i, C_i)$ (ST26). The content item $C_i$ thus decrypted is reproduced and browsed by the content browsing unit 38 (ST27). In the case where i=1, for example, the user device 30 stores the acquired first sharing key $Kd_1 = K_{1,2}, K_{2,1}$ in the key storage unit 36, and based on this sharing key $K_{1,2}$ and the sharing key $K_{1,1}$ previously received, restores the encryption key $K_1$. Using this encryption key $K_1$, the encrypted content item $E(K_1, C_1)$ is decrypted and the resulting content item $C_1$ is reproduced and browsed.

Also, the user, who can acquire the sharing key $K_{2,1}$ of the next encryption key $K_2$ upon acquisition of the first sharing key $Kd_1$, returns to step ST22 and acquires by requesting the second sharing key $Kd_2$ including the sharing key $K_{2,2}$ of the encryption key $K_2$ if desirous of browsing the content item $C_2$ (i=2).

Once the second sharing key $Kd_2$ is acquired, the sharing keys $K_{2,1}, K_{2,2}$ of the encryption key $K_2$ can be acquired, and therefore, the encryption key $K_2$ can be restored by the sharing key restoration unit 39'. Thus, the encrypted content item $E(K_2, C_2)$ is decrypted by the encrypted content decryption unit 37' and the content item $C_2$ can be browsed.

The user can acquire the sharing key $K_{3,1}$ of the next encryption key $K_3$ at the time of acquisition of the second sharing key $Kd_2$, and therefore, if desirous of browsing the content item $C_3$ (i=3), requests and acquires the third sharing key $Kd_3$ including the sharing key $K_{3,2}$ of the encryption key $K_3$.

Once the third sharing key $Kd_3$ is acquired, the sharing keys $K_{3,1}, K_{3,2}$ of the encryption key $K_3$ can be obtained, and therefore, the encryption key $K_3$ can be restored by the sharing key restoration unit 39'. Thus, the encrypted content item $E(K_3, C_3)$ is decrypted by the encrypted content decryption unit 37', thereby making it possible to browse the content item $C_3$.

The user, if desirous of browsing the content item $C_3$ by skipping the content item $C_2$ after browsing the content item $C_1$, can request the encryption key $K_3$ instead of the sharing key in step ST22. Similarly, the encryption key can be requested whenever desirous of skipping the order in all of the embodiments described below.

As described above, according to this embodiment, all the encrypted content items are distributed collectively on the one hand, and whenever desirous of browsing the (i+1)th content item $C_{i+1}$, the i-th sharing key $Kd_i$ (=$Kd_{i,2}||Kd_{i+1,1}$) for browsing the immediately preceding i-th content item $C_i$ is acquired thereby to acquire the (i+1)th sharing key $K_{i+1,1}$ on the other hand. As in the first embodiment, therefore, the content items can be browsed in the order intended by the content producer or the content browser.

Although this embodiment has been explained above with reference to a case in which m=3, the invention is not limited to this embodiment and applicable to an arbitrary number m of content items as shown in FIGS. 14, 15, 16A, 16B, 16C and 16D.

(Third Embodiment)

Figure 17:
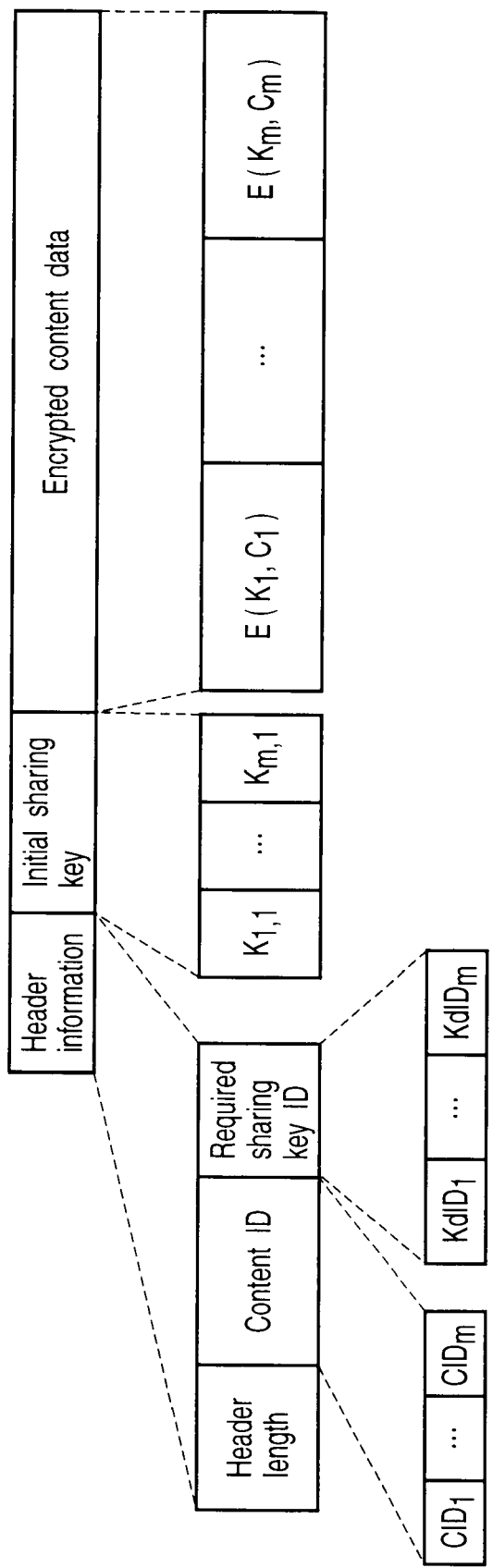
FIG. 17 is a schematic diagram showing the structure of package data according to a third embodiment of the invention.
Figure 19A:
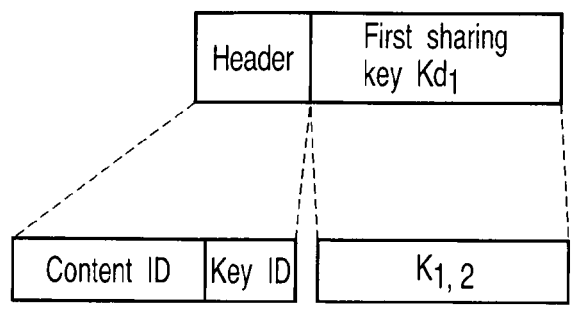
FIGS. 19A, 19B, 19C and 19D are schematic diagrams showing the structure of the key distribution data according to the same embodiment.
Figure 19B:
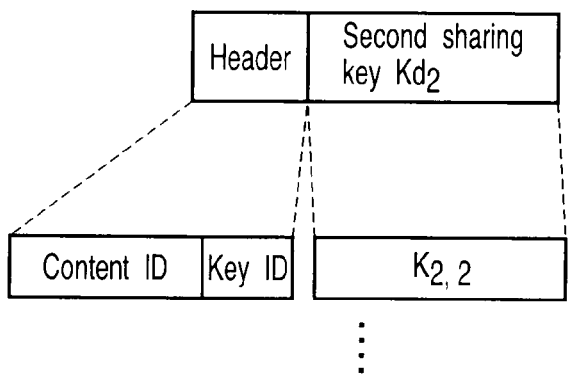
Figure 19C:
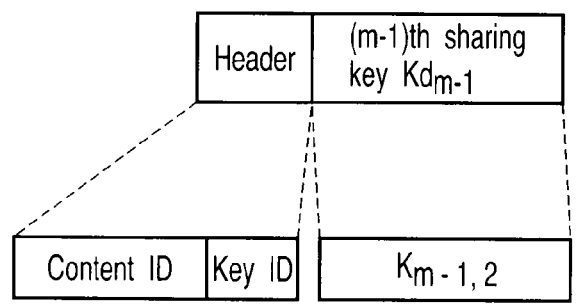
Figure 19D:
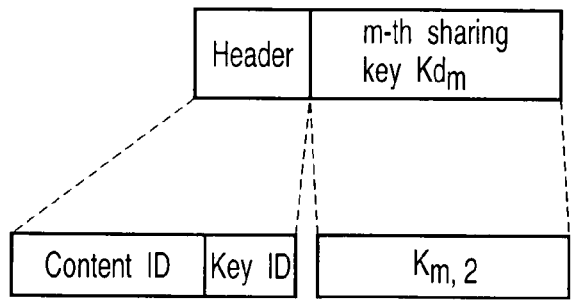
Figure 22A:
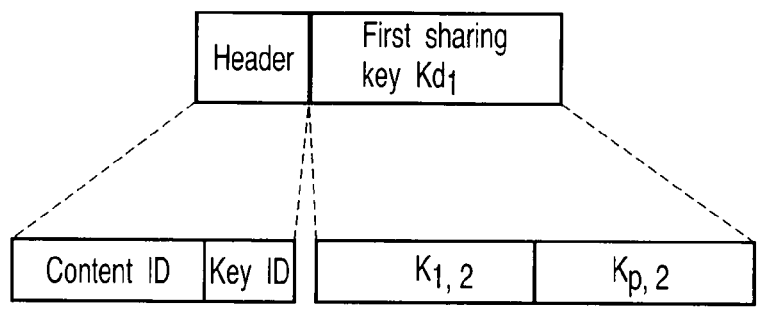
FIGS. 22A, 22B, 22C and 22D are schematic diagrams showing the structure of key distribution data according to the same embodiment.
Figure 22B:
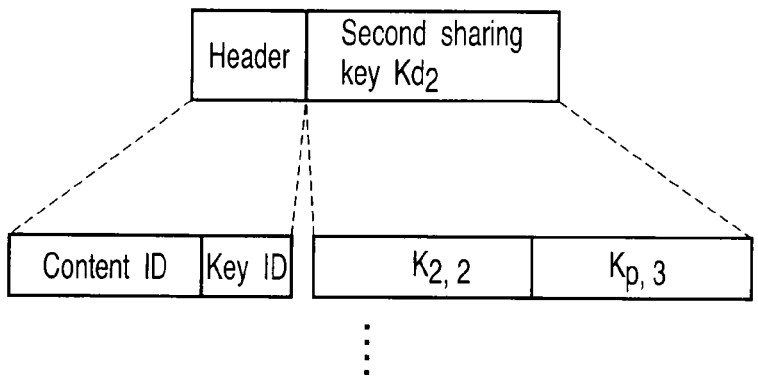
Figure 22C:
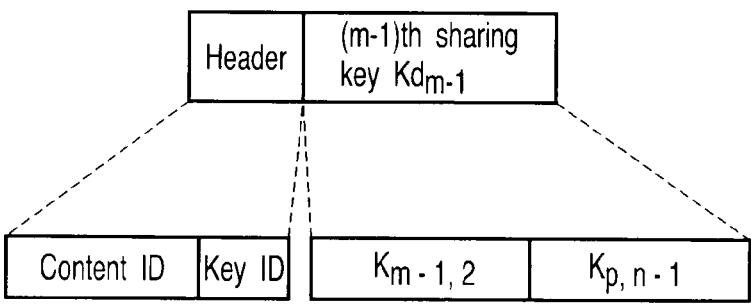
Figure 22D:
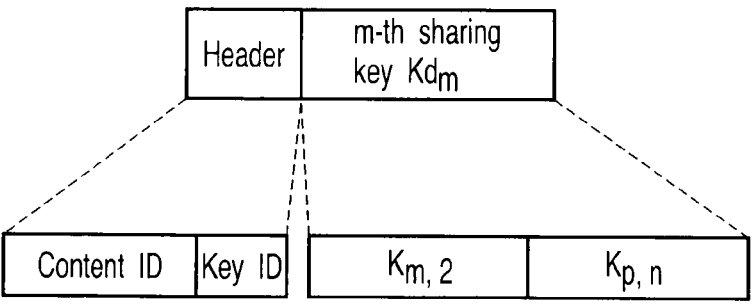

FIG. 17 is a schematic diagram showing the structure of the package data of the encrypted content used for a content distribution/browsing system according to a third embodiment of the invention, FIG. 18 a schematic diagram showing the relation between the encryption keys and the sharing keys used for the same system, and FIGS. 19A, 19B, 19C and 19D are schematic diagrams showing the structure of the key distribution data used with the same system.

According to this embodiment which is a modification of the second embodiment, the encryption key $K_i$ can be restored and the content item $C_i$ can be browsed by acquiring i-th sharing key in the desired i-th order. As shown in FIGS. 17, 18, 19A, 19B, 19C and 19D, the sharing keys $K_{1,1}, K_{2,1}, \ldots, K_{m,1}$ constituting one of the sharing key sets are included in the initial sharing key $Kd_0$ and distributed in advance.

In this case, the initial sharing key $Kd_0$ and the i-th sharing key $Kd_i$ have the following configuration:

Initial sharing key $Kd_0 = K_{1,1} || K_{2,1} || \ldots || K_{m,1}$ i-th sharing key $Kd_i = K_{i,2}$ Due to this configuration, the distribution server unit 10 lacks the encryption key storage unit 12' and the encryption key distribution unit 19, and the package generating unit 16' has the function of generating the package data as shown in FIG. 17. Also, the function of the key request receiving unit 18 to judge the key request is omitted, and the sharing key distribution unit 20 has the function of distributing the i-th sharing key $Kd_i = K_{i,2}$ together with the header information as key distribution data, as shown in FIGS. 18, 19A, 19B, 19C and 19D.

Specifically, the package generating unit 16' has the following functions (f16'-1) to (f16'-3):

(f16'-1) The function of concatenating the sharing keys $K_{1,1}, \ldots, K_{m,1}$ constituting one of all the sharing key sets in the sharing key storage unit 15 on the one hand and the encrypted content items $E(K_1, C_1), \ldots, E(K_m, C_m)$ received from the encryption unit 14' on the other hand with each other thereby to obtain the concatenated data $K_{1,1} || \ldots || K_{m,1} || E(K_1, C_1) || \ldots || E(K_m, C_m)$.

(f16'-2) The function of generating the package data based on the concatenated data.

(f16'-3) The function of outputting the package data to the medium Md or the communication unit 17.

In the user device 30, on the other hand, the key requesting/receiving unit 35' lacks the function of transmitting the encryption key request.

Specifically, the key requesting/receiving unit 35' has the following functions (f35'-1) and (f35'-2):

(f35'-1) The function of transmitting the i-th sharing key request to the distribution server unit 10 through the communication unit 32 by user operation, and receiving the sharing key $K_{i,2}$ from the distribution server unit 10.

(f35'-2) The function of writing the received sharing key $K_{i,2}$ in the key storage unit 36.

With the configuration described above, the content items can be browsed in an arbitrary order by requesting the i-th sharing key $Kd_i$ in the desired i-th order after holding the package data including the initial sharing key $Kd_0$ and the encrypted content in advance. Specifically, the user, unlike in the first and second embodiments, can browse the desired content items in an arbitrary order without using the encryption key request.

(Fourth Embodiment)

FIG. 20 is a schematic diagram showing the structure of the package data of the encrypted content used in a content distribution/browsing system according to a fourth embodiment of the invention, FIG. 21 a schematic diagram showing the relation between the encryption keys and the sharing keys used in the system, and FIGS. 22A, 22B, 22C and 22D schematic diagrams showing the structure of the package data of the sharing key used with the same system.

In this embodiment which is a modification of the second embodiment, a special content item $C_p$ can be browsed by purchasing a predetermined number of content items (sharing keys). As shown in FIGS. 20, 21, 22A, 22B, 22C and 22D, the sharing keys $K_{1,1}, K_2, \ldots, K_{m,1}$ constituting one of all the sharing key sets are distributed in the state included in the initial sharing key $Kd_0$ in advance on the one hand, and the sharing keys $K_{p,1}, K_{p,2}, \ldots, K_{p,n}$ of the special content item $C_p$ are individually included in the initial sharing $Kd_0$ and the i-th sharing key $Kd_i$ (i=1, 2, ..., m) on the other hand.

Specifically, the initial sharing key $Kd_0$ and the i-th sharing key $Kd_i$ have the configuration described below.

Initial sharing key $Kd_0 = K_{1,1} \| K_{2,1} \| \ldots \| K_{m,1} \| K_{p,1}$ i-th sharing key $Kd_i = K_{i,2} \| K_{p,i+1}$ Accordingly, the configuration of the component parts 11a to 20 of the distribution server unit 10 is modified as described below.

The key generating unit 11a has the following functions (f11a-1) to (f11a-3):

(f11a-1) The function of generating the first to m-th encryption keys $K_1, \ldots, K_m$ for the first to m-th content items $C_1, \ldots, C_m$ and a content item $C_p$ other than the content items $C_1, \ldots, C_m$, while at the same time generating an encryption key $K_p$ other than the encryption keys $K_1, \ldots, K_m$.

(f11a-2) The function of writing the encryption keys $K_1, \ldots, K_m, K_p$ in the encryption key storage unit 12'.

(f11a-3) The function of sending out the encryption keys $K_1, \ldots, K_m, K_p$ to the encryption key sharing unit 11b.

The encryption key sharing unit 11b has the following functions (f11b-1) to (f11b-3):

(f11b-1) The function of generating the first to m-th sharing keys $K_{1,1}, K_{1,2}, \ldots, K_{1,n}, \ldots, K_{m,1}, K_{m,2}, \ldots, K_{m,n}$ configured of sets of n sharing keys by the (2, n)-threshold secret sharing scheme for the first to m-th encryption keys $K_1, \ldots, K_m$.

(f11b-2) The function of generating n sharing keys $K_{p,1}, K_{p,2}, \ldots, K_{p,k}, \ldots, K_{p,n}$ by the (k, n)-threshold secret sharing scheme for another encryption key $K_p$.

(f11b-3) The function of writing the sharing keys $K_{1,1}, K_{1,2}, \ldots, K_{1,n}, \ldots, K_{m,1}, K_{m,2}, \ldots, K_{m,n}, K_{p,1}, K_{p,2}, \ldots, K_{p,n}$ in the sharing key storage unit 15, where n in the (2, n)-threshold secret sharing scheme is 3 and n in the (k, n)-threshold secret sharing scheme is m+1.

The encryption key storage unit 12', writable by the key generating unit 11a and readable by the encryption key distribution unit 19, is for storing the encryption keys $K_1, \ldots, K_m, K_p$.

The encryption unit 14' has the following functions (f14'-1) and (f14'-2):

(f14'-1) The function of encrypting the first to m-th content items $C_1, \ldots, C_m$ and another content item $C_p$ based on the encryption keys $K_1, \ldots, K_m$ and another encryption key $K_p$, respectively, thereby to obtain the first to m-th encrypted content items $E(K_1, C_1), \ldots, E(K_m, C_m)$ and another encrypted content item $E(K_p, C_p)$, respectively.

(f14'-2) The function of sending out the obtained encrypted content items to the package generating unit 16'.

The sharing key storage unit 15, writable by the encryption key sharing unit 11b and readable by the sharing key distribution unit 20, is for storing the sharing keys $K_{1,1}, K_{1,2}, \ldots, K_{1,n}, \ldots, K_{m,1}, K_{m,2}, \ldots, K_{m,n}, K_{p,1}, K_{p,2}, \ldots, K_{p,n}$.

The package generating unit 16' has the following functions (f16'-1) to (f16'-3):

(f16'-1) The function of concatenating one sharing key $K_{1,1}, \ldots, K_{m,1}$ in each of the first to m-th sharing key sets and one sharing key $K_{p,1}$ of the n sharing keys $K_{p,1}, \ldots, K_{p,n}$ in the sharing key storage unit 15 and the encrypted content items $E(K_1, C_1), \ldots, E(K_m, C_m), (K_p, C_p)$ received from the encryption unit 14' with each other thereby obtaining the concatenated data $K_{1,1} \| \ldots \| K_{m,1} \| K_{p,1} \| E(K_1, C_1) \| \ldots \| E(K_m, C_m)$.

(f16'-2) The function of generating the package data based on the concatenated data.

(f16'-3) The function of outputting the package data to the medium Md or the communication unit 17.

The communication unit 17 and the key request receiving unit 18 are similar to those described above.

The encryption key distribution unit 19 has the function of distributing the corresponding encryption key $K_p$ in the encryption key storage unit 12, together with the header information, to the user device 30 based on the encryption key request received from the user device 30 through the key request receiving unit 18. The header information includes the content ID and the key ID corresponding to the encryption key $K_p$ distributed.

The sharing key distribution unit 20 has the function of distributing the sharing keys of the corresponding order in the sharing key storage unit 15, together with the header information, to the user device 30, based on the sharing key request in any of the first to m-th orders received from the user device 30 through the key request receiving unit 18, as shown in FIGS. 22A, 22B, 22C and 22D. The sharing key distribution unit 20 has the following functions (f20-1) to (f20-3):

(f20-1) The function of concatenating the other sharing key $K_{1,2}, \ldots, K_{m,2}$ of the first to m-th sharing key sets individually with n−1 sharing keys $K_{p,2}, \ldots, K_{p,n}$ other than the sharing key $K_{p,1}$ in the concatenated data of n sharing keys $K_{p,1}, \ldots, K_{p,n}$ thereby to generate the first sharing keys $K_{1,2}, K_{p,2}$ to the m-th sharing keys $K_{m,2}, K_{p,n}$ for distribution.

(f20-2) The function of writing the first sharing keys $K_{1,2}, K_{p,2}$ to m-th sharing keys $K_{m,2}, K_{p,n}$ in the sharing key storage unit 15.

(f20-3) The function of distributing the corresponding order of sharing keys in the sharing key storage unit 15 to the user device 30 based on any of the first to m-th sharing key requests received from the user device 30.

The sharing key restoration unit 39' of the user device 30 further has the function of executing the (k, n)-threshold secret sharing scheme for restoring the encryption key $K_p$.

Specifically, the sharing key restoration unit 39' has the following functions (f39'-1) and (f39'-2):

(f39'-1) The function of restoring the first to m-th encryption keys $K_1, \ldots, K_m$ based on the sharing keys in the same set of the sharing keys $K_{1,1}, K_{1,2}, \ldots, K_{1,n}, \ldots, K_{m,1}, K_{m,2}, \ldots, K_{m,n}$.

(f39'-2) The function of restoring the encryption key $K_p$ based on k out of n sharing keys $K_{p,1}, K_{p,2}, \ldots, K_{p,k}, \ldots, K_{p,n}$.

With the configuration described above, like in the third embodiment, the content items can be browsed in an arbitrary order by requesting the i-th sharing key $Kd_i$ in the desired i-th order after holding the package data including the initial sharing key $Kd_0$ and the encrypted content.

In addition, assume a configuration in which the first to m-th sharing keys $K_{1,2}, K_{p,2}, \ldots, K_{m,2}, K_{p,n}$ for distribution include the sharing keys $K_{p,2}, K_{p,n}$, respectively, of other content items. In the case where the key information for a predetermined number of content items of the first to m-th sharing keys are acquired, therefore, other predetermined content items can also be browsed.

Specifically, in the case where a content item having k threshold values is browsed, it indicates that the sharing keys $K_{p,1}, \ldots, K_{p,k}$ having k threshold values of another content item $C_p$ are acquired. By restoring the encryption key $K_p$ from k sharing keys $K_{p,1}, \ldots, K_{p,k}$, another content item $C_p$ can be restored, reproduced and browsed.

In the case where k content items of a given series are browsed (sharing keys purchased), for example, the special content item $C_p$ such as "making video" can be browsed. In this way, the sharing keys $K_{p,1}, \ldots, K_{p,n}$ of another content item $C_p$ are included in the sharing keys $Kd_0, \ldots, Kd_m$ for decoding the target content items $C_1, \ldots, C_m$, and the required sharing key is sold at low price. In this way, the sale of the slow-selling content items can be promoted.

(Fifth Embodiment)

FIGS. 23A, 23B, 23C and 23D are diagrams showing the structure of the package data including the encrypted content items used for a content distribution/browsing system according to a fifth embodiment of the invention.

Figure 23A:
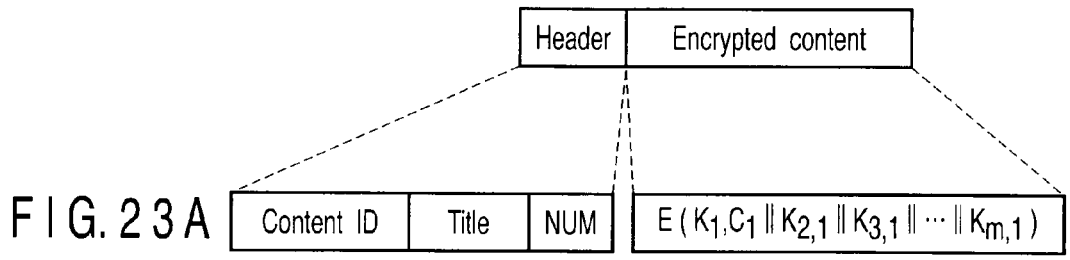
FIGS. 23A, 23B, 23C and 23D are schematic diagrams showing the structure of package data according to a fifth embodiment of the invention.

This embodiment represents an application of the third embodiment to the first embodiment. According to this embodiment, as shown in FIG. 23A, the encrypted content of the first package data makes up the encrypted content items $E(K_1, C_1\|K_{2,1}\|K_{3,1}\| \ldots \|K_{m,1})$ obtained by encrypting, based on the first encryption key $K_1$, the concatenated data $C_1\|K_{2,1}\|K_{3,1}\| \ldots \|K_{m,1}$ resulting from the mutual concatenation of the first content item $C_1$ and the sharing keys $K_{2,1}, \ldots, K_{m,1}$ each constituting the other sharing key of the second to m-th sharing key sets, respectively.

Figure 23B:
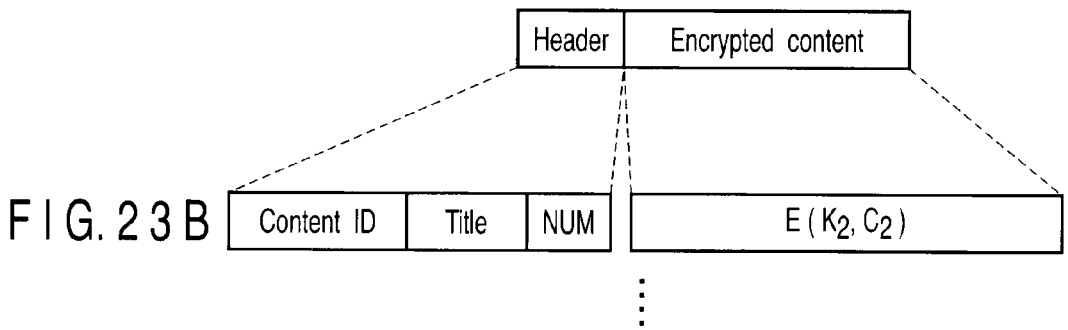
Figure 23C:
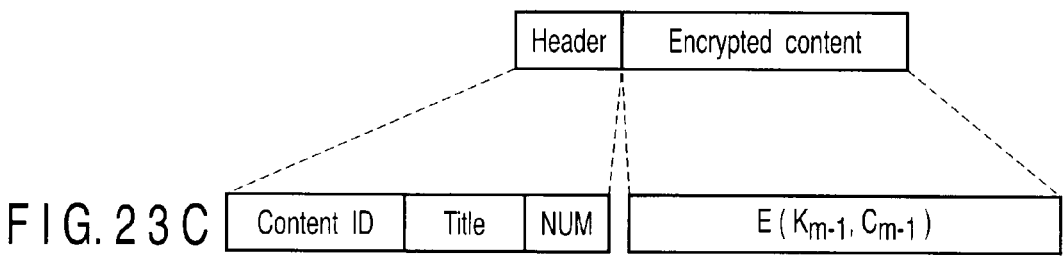
Figure 23D:
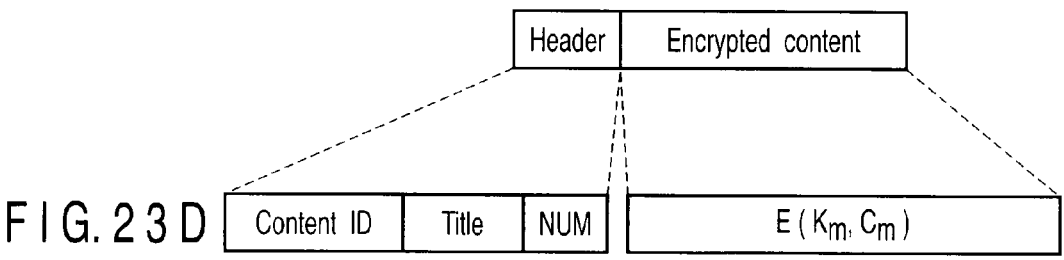

Also, the encrypted content items of the second to m-th package data, as shown in FIGS. 23B, 23C and 23D, make up the encrypted content items $E(K_2, C_2), \ldots, E(K_m, C_m)$.

Incidentally, the encryption key and the sharing key has such a data structure as shown in FIGS. 5A, 5B, 5C and 5D, in which the first key is the encryption key $K_1$ and the second to m-th keys are the sharing keys $K_{2,2}, \ldots, K_{m,2}$.

This configuration, like that of the third embodiment, produces the advantage that an arbitrary content item can be browsed.

(Sixth Embodiment)

FIGS. 24A, 24B, 24C and 24D are diagrams showing the structure of the package data including the encrypted content items used in a content distribution/browsing system according to a sixth embodiment of the invention.

According to this embodiment, which is an application of the fourth embodiment to the first embodiment, the encrypted content of the first package data, as shown in FIG. 24A, is given as $E(K_1, C_1\|K_{2,1}\|K_{3,1}\| \ldots \|K_{m,1}\|K_{p,1})$ obtained by encrypting, based on the first encryption key $K_1$, the concatenated data $C_1\|K_{2,1}\|K_{3,1}\| \ldots \|K_{m,1}\|K_{p,1}$ resulting from the concatenation of the first content item $C_1$, the sharing keys $K_{2,1}, \ldots, K_{m,1}$ each constituting one sharing key of the second to m-th sharing keys and one sharing key $K_{p,1}$ of another content item $C_p$.

Also, the encrypted content items of the second to m-th package data are given as $E(K_2, C_2), \ldots, E(K_m, C_m)$ as shown in FIGS. 24B, 24C and 24D.

Figure 25A:
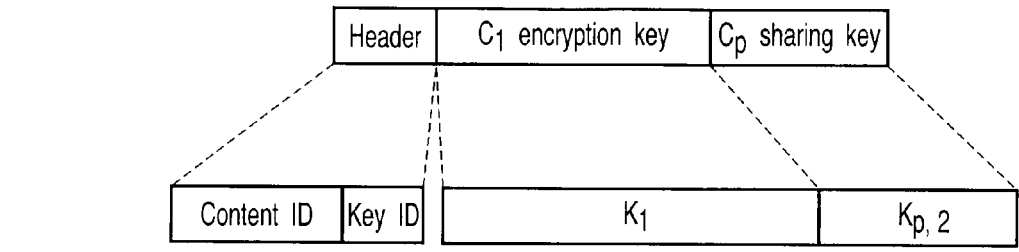
FIGS. 25A, 25B, 25C and 25D are schematic diagrams showing the structure of key distribution data according to the same embodiment.
Figure 25B:
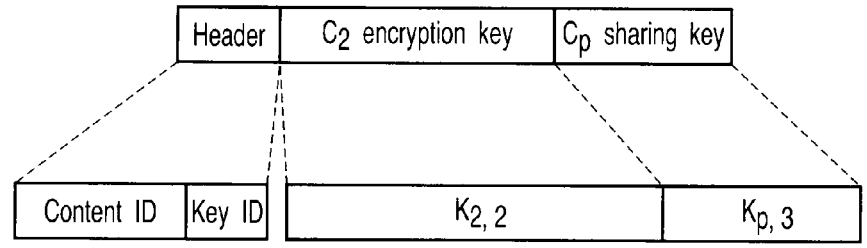
Figure 25C:
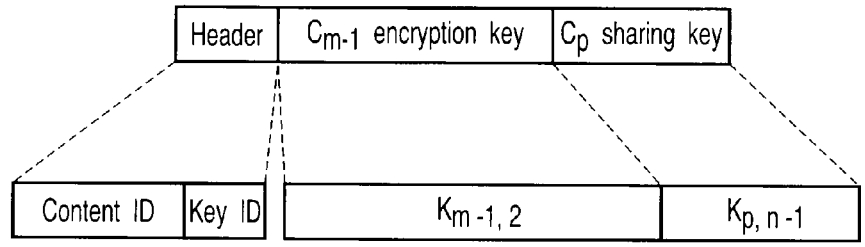
Figure 25D:
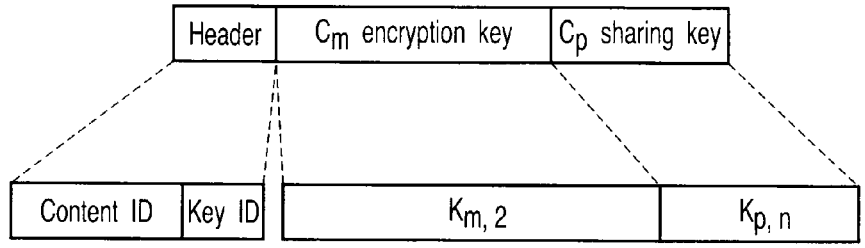

Incidentally, the structure of the key distribution data of the encryption key and the sharing key, as shown in FIG. 25A, is such that the first data is the concatenated data $K_1\|K_{p,2}$ of the encryption key $K_1$ and the sharing key $K_{p,2}$, and as shown in FIGS. 25B, 25C and 25D, the second to m-th keys constitute the concatenated data $K_{2,2}\|K_{p,3}, \ldots, K_{m,2}\|K_{p,n}$ of the sharing keys.

The configuration described above, like the fourth embodiment, can produce the advantage that both arbitrary content items $C_1$ to $C_m$ and a special content item $C_p$ can be browsed.

The technique described above for the embodiment can be stored as a program to be executed by a computer in memory mediums including magnetic disks (Floppy™ disks, hard disks, etc.), optical disks (CD-ROMs, DVDs, etc.), magneto-optical disks (MOs) and semiconductor memories for distribution.

Memory mediums that can be used for the purpose of the present invention are not limited to those listed above and memory mediums of any type can also be used for the purpose of the present invention so long as they are computer-readable ones.

Additionally, the operating system (OS) operating on a computer according to the instructions of a program installed in the computer from a memory medium, data base management software and/or middleware such as network software may take part in each of the processes for realizing the above embodiment.

Still additionally, memory mediums that can be used for the purpose of the present invention are not limited to those independent from computers but include memory mediums adapted to download a program transmitted by LANs and/or the Internet and permanently or temporarily store it.

It is not necessary that a single memory medium is used with the above described embodiment. In other words, a plurality of memory mediums may be used with the above-described embodiment to execute any of the above described various processes. Such memory mediums may have any configuration.

For the purpose of the present invention, a computer executes various processes according to one or more than one programs stored in the memory medium or mediums as described above for the preferred embodiment. More specifically, the computer may be a stand alone computer or a system realized by connecting a plurality of computers by way of a network.

For the purpose of the present invention, computers include not only personal computers but also processors and microcomputers contained in information processing apparatus. In other words, computers generally refer to apparatus and appliances that can realize the functional features of the present invention by means of a computer program.

The present invention is by no means limited to the above described embodiment, which may be modified in various different ways without departing from the spirit and scope of the invention. Additionally, any of the components of the above described embodiment may be combined differently in various appropriate ways for the purpose of the present invention. For example, some of the components of the above described embodiment may be omitted. Alternatively, components of different embodiments may be combined appropriately in various different ways for the purpose of the present invention.

What is claimed is:

1. A content distribution/browsing system comprising a content distribution apparatus and a content browsing apparatus communicable with each other, the content distribution apparatus comprising:

a key generating device configured to generate, by random number generation, a first encryption key $K_1$ and second to m-th sharing keys $K_{2,1}, K_{2,2}, \ldots, K_{m,1}, K_{m,2}$ in sets of two sharing keys for first to m-th content items $C_1, \ldots, C_m$;

an encryption key storage device which stores the first encryption key $K_1$;

an encryption key calculation device configured to calculate second to m-th encryption keys $K_2, \ldots, K_m$ based on the sharing keys in the same set of the sharing keys $K_{2,1}, K_{2,2}, \ldots, K_{m,1}, K_{m,2}$;

a concatenation device configured to concatenate the first to (m−1)th content items $C_1, \ldots, C_{m-1}$ with the sharing keys $K_{2,1}, \ldots, K_{m,1}$ each constituting one sharing key in the second to m-th sharing key sets thereby to produce first to (m−1)th concatenated data $C_1\|K_{2,1}, \ldots, C_{m-1}\|K_{m,1}$;

a sharing key storage device which stores the other sharing key $K_{2,2}, \ldots, K_{m,2}$ in each set of the sharing keys among the second to m-th sharing keys;

an encryption device configured to encrypt the first to (m−1)th concatenated data $C_1\|K_{2,1}, \ldots, C_{m-1}\|K_{m,1}$ based on the first to (m−1)th encryption keys $K_1, \ldots, K_{m-1}$, respectively, thereby to produce the first to (m−1)th encrypted content items $E(K_1, C_1\|K_{2,1}), \ldots, E(K_{m-1}, C_{m-1}\|K_{m,1})$, while at the same time encrypting the m-th content item $C_m$ based on the m-th encryption key $K_m$ thereby to produce the m-th encrypted content item $E(K_m, C_m)$;

an output device configured to output said each encrypted content item $E(K_1, C_1\|K_{2,1}), \ldots, E(K_{m-1}, C_{m-1}\|K_{m,1}), E(K_m, C_m)$;

an encryption key distribution device configured to distribute the encryption key in the encryption key storage device to the content browsing apparatus based on an encryption key request received from the content browsing apparatus; and a sharing key distribution device configured to distribute the sharing keys in the corresponding order in the sharing key storage device to the content browsing apparatus based on any of the second to m-th sharing key requests received from the content browsing apparatus, and the content browsing apparatus comprising:

a content storage device adapted to store the first, second to m-th encrypted content items $E(K_1, C_1\|K_{2,1}), E(K_2, C_2\|K_{3,1}), \ldots, E(K_{m-1}, C_{m-1}\|K_{m,1}), E(K_m, C_m)$;

an encryption key request device configured to transmit the encryption key request to the content distribution apparatus and receive the first encryption key $K_1$ from the content distribution apparatus;

a decryption device configured to decrypt an i-th encrypted content item $E(K_1, C_1\|K_{i+1,1})$ or $E(K_m, C_m)$ in the content storage device based on the input encryption key $K_i$ (i=1, 2, ..., i, i+1, ..., m);

a browsing device configured to browse an i-th content item $C_i$ obtained by the decryption device;

a sharing key request device configured to transmit an (i+1)th sharing key request to the content distribution apparatus and receive the sharing key $K_{i+1,2}$ from the content distribution apparatus in the case where the i-th content item $C_i$ browsed is not the m-th content item $C_m$; and a device configured to restore the (i+1)th encryption key $K_{i+1}$ based on the sharing key $K_{i+1,2}$ and the (i+1)th sharing key $K_{+1,1}$ obtained by the decryption device and input the obtained encryption key $K_{i+1}$ to the decryption device.

2. A content distribution apparatus communicable with a content browsing apparatus, comprising:

a key generating device configured to generate a first encryption key $K_1$ and second to m-th sharing keys $K_{2,1}, K_{2,2}, \ldots, K_{m,1}, K_{m,2}$ in sets of two by generating a random number for first to m-th content items $C_1, \ldots, C_m$;

an encryption key storage device which stores the first encryption key $K_1$;

an encryption key calculation device configured to calculate second to m-th encryption keys $K_2, \ldots, K_m$ based on the sharing keys in the same set of the sharing keys $K_{2,1}, K_{2,2}, \ldots, K_{m,1}, K_{m,2}$;

a concatenation device configured to concatenate the first to (m−1)th content items $C_1, \ldots, C_{m-1}$ with the sharing keys $K_{2,1}, \ldots, K_{m,1}$ each constituting one component of each set of the second to m-th sharing keys thereby to produce first to (m−1)th concatenated data $C_1\|K_{2,1}, \ldots, C_{m-1}\|K_{m,1}$;

a sharing key storage device which stores the sharing keys $K_{2,2}, \ldots, K_{m,2}$ each constituting the other component of each set of the second to m-th sharing keys;

an encryption device configured to encrypt the first to (m−1)th concatenated data $C_1\|K_{2,1}, \ldots, C_{m-1}\|K_{m,1}$ based on the first to (m−1)th encryption keys $K_1, \ldots, K_{m-1}$, respectively, thereby to produce the first to (m−1)th encrypted content items $E(K_1, C_1\|K_{2,1}), \ldots, E(K_{m-1}, C_{m-1}\|K_{m,1})$, while at the same time encrypting the m-th content item $C_m$ based on the m-th encryption key $K_m$ thereby to produce the m-th encrypted content item $E(K_m, C_m)$;

an output device configured to output said each encrypted content item $E(K_1, C_1\|K_{2,1}), \ldots, E(K_{m-1}, C_{m-1}\|K_{m,1}), E(K_m, C_m)$;

an encryption key distribution device configured to distribute the encryption key in the encryption key storage device to the content browsing apparatus based on an encryption key request received from the content browsing apparatus; and a sharing key distribution device configured to distribute the sharing keys in the corresponding order in the sharing key storage device to the content browsing apparatus based on any of the second to m-th sharing key requests received from the content browsing apparatus.

3. The content distribution apparatus according to claim 2, wherein the encryption key calculation device calculates the second to m-th encryption keys $K_2, \ldots, K_m$ by an exclusive-OR operation of the sharing keys in the same set of the sharing keys $K_{2,1}, K_{2,2}, \ldots, K_{m,1}, K_{m,2}$.

4. The content distribution apparatus according to claim 3, further comprising:

a device configured to judge whether a key request is a sharing key request or not, based on content ID and key type information included in the key request received from the content browsing apparatus; and a device configured to input the key request to the sharing key distribution device in the case where the judgment shows that the key request is a sharing key request, and otherwise input the key request to the sharing key distribution device.

5. The content distribution apparatus according to claim 2, further comprising:

a device configured to judge whether a key request is a sharing key request or not, based on content ID and key type information included in the key request received from the content browsing apparatus; and a device configured to input the key request to the sharing key distribution device in the case where the judgment shows that the key request is a sharing key request, and otherwise input the key request to the sharing key distribution device.

6. A content distribution apparatus communicable with a content browsing apparatus, comprising:

an encryption key generating device configured to generate first to m-th encryption keys $K_1, \ldots, K_m$ and an encryption key $K_p$ other than the encryption keys $K_1, \ldots, K_m$ for first to m-th content items $C_1, \ldots, C_m$ and a content item $C_p$ other than the first to m-th content items $C_1, \ldots, C_m$, respectively;

a first sharing key generating device configured to generate first to m-th sharing keys $K_{1,1}, K_{1,2}, \ldots, K_{1,n}, \ldots, K_{m,1}, K_{m,2}, \ldots, K_{m,n}$ in sets of n sharing keys by a (2, n)-threshold secret sharing scheme for the first to m-th encryption keys $K_1, \ldots, K_m$;

a second sharing key generating device configured to generate n sharing keys $K_{p,1}, K_{p,2}, \ldots, K_{p,k}, \ldots, K_{p,n}$ by the (k, n)-threshold secret sharing scheme for the another encryption key $K_p$;

an encryption device configured to encrypt the first to m-th content items $C_1, \ldots, C_m$ and the another content item $C_p$ based on the encryption keys $K_1, \ldots, K_m$ and the another encryption key $K_p$, respectively, thereby to produce first to m-th encrypted content items $E(K_1, C_1), \ldots, E(K_m, C_m)$ and another encrypted content item $E(K_p, C_p)$;

a concatenation device configured to concatenate each of the sharing keys $K_{1,1}, \ldots, K_{m,1}$ constituting one component of the first to m-th sharing keys, one sharing key $K_{p,1}$ of the n sharing keys $K_{p,1}, \ldots, K_{p,n}$ and all the encrypted content items $E(K_1, C_1), \ldots, E(K_m, C_m), (K_p, C_p)$ with each other thereby to produce concatenated data $K_{1,1} \| \ldots \| K_{m,1} \| K_{p,1} \| E(K_1, C_1) \| \ldots \| E(K_m, C_m)$;

a distribution sharing key generating device configured to individually concatenate the (n−1) sharing keys $K_{p,2}, \ldots, K_{p,n}$ other than the sharing key $K_{p,1}$ in the concatenated data included in the n sharing keys $K_{p,1}, \ldots, K_{p,n}$ for the sharing keys $K_{1,2}, \ldots, K_{m,2}$ constituting the other component of the first to m-th sharing keys, respectively, thereby to generate the first sharing key $K_{1,2}, K_{p,2}$ to the m-th sharing key $K_{m,2}, K_{p,n}$ for distribution;

a sharing key storage device which stores the first sharing key $K_{1,2}, K_{p,2}$ to the m-th sharing key $K_{m,2} K_{p,n}$;

an output device configured to output the concatenated data $K_{1,1} \| \ldots \| K_{m,1} \| K_{p,1} \| E(K_1, C_1) \| \ldots \| E(K_m, C_m)$; and a sharing key distribution device configured to distribute the sharing key of the corresponding order in the sharing key storage device to the content browsing apparatus based on any of the first to m-th sharing key requests received from the content browsing apparatus.

7. A content browsing apparatus communicable with a content distribution apparatus, comprising:

a content storage device adapted to store encrypted content items $E(K_1, C_1 \| K_{2,1})$, $E(K_2, C_2 \| K_{3,1}), \ldots, E(K_{m-1}, C_{m-1} \| K_{m,1})$, $E(K_m, C_m)$ output from the content distribution apparatus which generates a first encryption key $K_1$ and second to m-th sharing keys $K_{2,1}, K_{2,2}, \ldots, K_{m,1}, K_{m,2}$ in sets of two by random number generation for first to m-th content items $C_1$ to $C_m$, calculates second to m-th encryption keys $K_2, \ldots, K_m$ based on the sharing keys in the same set of the sharing keys $K_{2,1}, K_{2,2}, \ldots, K_{m,1}, K_{m,2}$, concatenates the first to (m−1)th content items $C_1, \ldots, C_{m-1}$ with the sharing keys $K_{2,1}, \ldots, K_{m,1}$ constituting one sharing key of each set of the second to m-th sharing keys, encrypts the first to (m−1)th concatenated data $C_1 \| K_{2,1}, \ldots, C_{m-1} \| K_{m,1}$ based on the first to (m−1)th encryption keys $K_1, \ldots, K_{m-1}$, respectively, thereby to produce the first to (m−1)th encrypted content items $E(K_1, C_1 \| K_{2,1}), \ldots, E(K_{m-1}, C_{m-1} \| K_{m,1})$ while at the same time encrypting the m-th content item $C_m$ based on the m-th encryption key $K_m$ thereby to produce the m-th encrypted content item $E(K_m, C_m)$;

an encryption key requesting device configured to transmit an encryption key request to the content distribution apparatus and receive the first encryption key $K_1$ from the content distribution apparatus;

a decryption device configured to decrypt the corresponding i-th encrypted content item $E(K_i, C_i \| K_{i+1,1})$ or $E(K_m, C_m)$ in the content storage device based on the input encryption key $K_i$ (i=1, 2, \ldots, i, i+1, \ldots, m);

a browsing device configured to browse the i-th content item $C_i$ obtained by the decryption device;

a sharing key requesting device configured to transmit the (i+1)th sharing key request to the content distribution apparatus and receive the sharing key $K_{i+1,2}$ from the content distribution apparatus in the case where the browsed i-th content item $C_i$ is other than the m-th content item $C_m$; and a device configured to restore the (i+1)th encryption key $K_{i+1}$ based on the (i+1)th sharing key $K_{i+1,2}$ and the (i+1)th sharing key $K_{i+1,1}$ obtained by the decryption device, and input the obtained encryption key $K_{i+1}$ to the decryption device.

8. A program stored in a non-transitory computer-readable storage medium used for a content distribution apparatus communicable with a content browsing apparatus and including a storage unit, comprising:

a first program code which causes the content distribution apparatus to execute a process of generating a first encryption key $K_1$ and second to m-th sharing keys $K_{2,1}, K_{2,2}, \ldots, K_{m,1}, K_{m,2}$ in sets of two by random number generation for first to m-th content items $C_1, \ldots, C_m$, respectively;

a second program code which causes the content distribution apparatus to execute a process of writing the first encryption key $K_1$ in the storage unit;

a third program code which causes the content distribution apparatus to execute a process of calculating second to m-th encryption keys $K_2, \ldots, K_m$ based on the sharing keys in the same set of the sharing keys $K_{2,1}, K_{2,2}, \ldots, K_{m,1}, K_{m,2}$;

a fourth program code which causes the content distribution apparatus to execute a process of concatenating the first to (m−1)th content items $C_1, \ldots, C_{m-1}$ with the sharing keys $K_{2,1}, \ldots, K_{m,1}$ constituting one component of each set included in the second to m-th sharing keys thereby to produce first to (m−1)th concatenated data $C_1 \| K_{2,1}, \ldots, C_{m-1} \| K_{m,1}$;

a fifth program code which causes the content distribution apparatus to execute a process of writing the other component sharing key $K_{2,2}, \ldots, K_{m,2}$ of each set included in the second to m-th sharing keys in the storage unit;

a sixth program code which causes the content distribution apparatus to execute a process of encrypting the first to (m−1)th concatenated data $C_1 \| K_{2,1}, \ldots, C_{m-1} \| K_{m,1}$ based on the first to (m−1)th encryption keys $K_1, \ldots, K_{m-1}$, respectively, thereby to produce first to (m−1)th encrypted content items $E(K_1, C_1 \| K_{2,1}), \ldots, E(K_{m-1}, C_{m-1} \| K_{m,1})$, while at the same time encrypting the m-th content item $C_m$ based on the m-th encryption key $K_m$ thereby to produce an m-th encrypted content item $E(K_m, C_m)$;

a seventh program code which causes the content distribution apparatus to execute a process of outputting said each encrypted content item $E(K_1, C_1 \| K_{2,1}), \ldots, E(K_{m-1}, C_{m-1} \| K_{m,1}), E(K_m, C_m)$;

an eighth program code which causes the content distribution apparatus to execute a process of distributing the encryption key in the storage unit to the content browsing apparatus based on an encryption key request received from the content browsing apparatus; and a ninth program code which causes the content distribution apparatus to execute a process of distributing the sharing keys in the corresponding order in the storage unit to the content browsing apparatus based on any of the second to m-th sharing key requests received from the content browsing apparatus.

9. The program according to claim 8,
wherein the encryption key calculation process is for calculating the second to m-th encryption keys $K_2, \ldots, K_m$ by an exclusive-OR operation of the sharing keys in the same set included in the sharing keys $K_{1,1}, K_{1,2}, \ldots, K_{m,1}, K_{m,2}$.

10. The program according to claim 9, further comprising:
a tenth program code which causes the content distribution apparatus to execute a process of judging whether the key request is a sharing key request received from the content browsing apparatus, based on content ID and key type information contained in the key request; and
an eleventh program code which causes the content distribution apparatus to execute a process of inputting the key request to the sharing key distribution process in the case where the judgment shows that the key request is a sharing key request, and inputting the key request to the encryption key distribution process otherwise.

11. The program according to claim 8, further comprising:
a tenth program code which causes the content distribution apparatus to execute a process of judging whether the key request is a sharing key request received from the content browsing apparatus, based on content ID and key type information contained in the key request; and
an eleventh program code which causes the content distribution apparatus to execute a process of inputting the key request to the sharing key distribution process in the case where the judgment shows that the key request is a sharing key request, and inputting the key request to the encryption key distribution process otherwise.

12. A program stored in a non-transitory computer-readable storage medium used for a content distribution apparatus communicable with a content browsing apparatus and including a storage unit, comprising:
a first program code which causes the content distribution apparatus to execute a process of generating first to m-th encryption keys $K_1, \ldots, K_m$ and an encryption key $K_p$ other than the encryption keys $K_1, \ldots, K_m$ for first to m-th content items $C_1, \ldots, C_m$ and content item $C_p$ other than the first to m-th content items $C_1, \ldots, C_m$, respectively;

a second program code which causes the content distribution apparatus to execute a process of generating first to m-th sharing keys $K_{1,1}, K_{1,2}, \ldots, K_{1,n}, \ldots, K_{m,1}, K_{m,2}, \ldots, K_{m,n}$ in sets of n by a (2, n)-threshold secret sharing scheme for the first to m-th encryption keys $K_1, \ldots, K_m$;

a third program code which causes the content distribution apparatus to execute a process of generating n sharing keys $K_{p,1}, K_{p,2}, \ldots, K_{p,k}, K_{p,n}$ by a (k, n)-threshold secret sharing scheme for the another encryption key $K_p$;

a fourth program code which causes the content distribution apparatus to execute a process of encrypting the first to m-th content items $C_1, \ldots, C_m$ and the another content item $C_p$ based on the encryption keys $K_1, \ldots, K_m$ and the another encryption key $K_p$, respectively, thereby to produce first to m-th encrypted content items $E(K_1, C_1), \ldots, E(K_m, C_m)$ and another encrypted content item $E(K_p, C_p)$;

a fifth program code which causes the content distribution apparatus to execute a process of concatenating the sharing keys $K_{1,1}, \ldots, K_{m,1}$ included in the first to m-th sharing keys, one sharing key $K_{p,1}$ included in the n sharing keys $K_{p,1}, \ldots, K_{p,n}$ and all the encrypted content items $E(K_1, C_1), \ldots, E(K_m, C_m), (K_p, C_p)$ with each other thereby to produce concatenated data $K_{1,1} \| \ldots \| K_{m,1} \| K_{p,1} \| E(K_1, C_1) \| \ldots \| E(K_m, C_m)$;

a sixth program code which causes the content distribution apparatus to execute a process of individually concatenating the (n−1) sharing keys $K_{p,2}, \ldots, K_{p,n}$ other than the sharing key $K_{p,1}$ in the concatenated data included in the n sharing keys $K_{p,1}, \ldots, K_{p,n}$ for the other sharing keys $K_{1,2}, \ldots, K_{m,2}$ included in the first to m-th sharing keys, respectively, thereby to generate the first sharing key $K_{1,2}, K_{p,2}$ to the m-th sharing key $K_{m,2}, K_{p,n}$ for distribution;

a seventh program code which causes the content distribution apparatus to execute a process of writing the first sharing key $K_{1,2}, K_{p,2}$ to the m-th sharing key $K_{m,2}, K_{p,n}$ in the storage unit;

an eighth program code which causes the contentdistribution apparatus to execute a process of outputting the concatenated data $K_{1,1} \| \ldots \| K_{m,1} \| K_{p,1} \| E(K_1, C_1) \| \ldots \| E(K_m, C_m)$; and a ninth program code which causes the content distribution apparatus to execute a process of distributing the sharing keys of the corresponding order in the storage unit to the content browsing apparatus based on any of the first to m-th sharing key requests received from the content browsing apparatus.

13. A program stored in a non-transitory computer-readable storage medium used for a content browsing apparatus communicable with a content distribution apparatus and including a storage unit, comprising:
a first program code which causes the content browsing apparatus to execute a process of writing in the storage unit, by user operation, an arbitrary one of encrypted content items $E(K_1, C_1\|K_{2,1})$, $E(K_2, C_2\|K_{3,1})$, ..., $E(K_{m-1}, C_{m-1}\|K_{m,1})$, $E(K_m, C_m)$ included in the encrypted content items $E(K_1, C_1\|K_{2,1})$, ..., $E(K_{m-1}, C_{m-1}\|K_{m,1})$, $E(K_m, C_m)$ output from the content distribution apparatus, which generates a first encryption key $K_1$ and second to m-th sharing keys $K_{2,1}, K_{2,2}, \ldots, K_{m,1}, K_{m,2}$ in sets of two for first to m-th content items $C_1, \ldots, C_m$, calculates second to m-th encryption keys $K_2, \ldots, K_m$ based on the sharing keys in the same set of the sharing keys $K_{2,1}, K_{2,2}, \ldots, K_{m,1}, K_{m,2}$, concatenates the first to (m−1)th content items $C_1, \ldots, C_{m-1}$ with the sharing keys $K_{2,1}, \ldots, K_{m,1}$ each constituting one sharing key of each set included in the second to m-th sharing keys, encrypts first to (m−1)th concatenated data $C_1\|K_{2,1}, \ldots, C_{m-1}\|K_{m,1}$ based on the first to (m−1)th encryption keys $K_1, \ldots, K_{m-1}$, respectively, thereby to produce the first to (m−1)th encrypted content items $E(K_1, C_1\|K_{2,1}), \ldots, E(K_{m-1}, C_{m-1}\|K_{m,1})$ while at the same time encrypting the m-th content item $C_m$ based on the m-th encryption key $K_m$ thereby to produce the m-th encrypted content item $E(K_m, C_m)$;

a second program code which causes the content browsing apparatus to execute a process of transmitting an encryption key request to the content distribution apparatus and receiving the first encryption key $K_1$ from the content distribution apparatus;

a third program code which causes the content browsing apparatus to execute a process of decrypting the corresponding i-th encrypted content item $E(K_i, C_i\|K_{i+1,1})$ or $E(K_m, C_m)$ in the storage unit based on the input encryption key $K_i$ (i=1, 2, ..., i, i+1, ..., m);

a fourth program code which causes the content browsing apparatus to execute a process of browsing the i-th content item $C_i$ obtained by the decryption process;

a fifth program code which causes the content browsing apparatus to execute a process of transmitting the (i+1)th sharing key request to the content distribution apparatus and receiving the sharing key $K_{i+1,2}$ from the content distribution apparatus in the case where the browsed i-th content item $C_i$ is not the m-th content item $C_m$; and a sixth program code which causes the content browsing apparatus to execute a process of restoring the (i+1)th encryption key $K_{i+1}$ based on the sharing key $K_{i+1,2}$ and the (i+1)th sharing key $K_{i+1,1}$ obtained by the decryption process, and inputting the encryption key $K_{i+1}$ thus obtained to the decryption process.

* * * * *